United States Patent
Tate

(10) Patent No.: US 12,020,474 B2
(45) Date of Patent: Jun. 25, 2024

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Shunta Tate, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/574,068

(22) Filed: Jan. 12, 2022

(65) Prior Publication Data
US 2022/0138490 A1    May 5, 2022

Related U.S. Application Data

(63) Continuation of application No. 16/053,473, filed on Aug. 2, 2018, now Pat. No. 11,256,955.

(30) Foreign Application Priority Data

Aug. 9, 2017    (JP) .................................. 2017-154728

(51) Int. Cl.
*G06V 10/82*    (2022.01)
*G06F 18/213*    (2023.01)
(Continued)

(52) U.S. Cl.
CPC ............ *G06V 10/82* (2022.01); *G06F 18/213* (2023.01); *G06F 18/24* (2023.01); *G06N 3/08* (2013.01); *G06T 7/11* (2017.01); *G06T 7/143* (2017.01); *G06T 7/194* (2017.01); *G06T 7/60* (2013.01); *G06T 7/70* (2017.01); *G06V 40/103* (2022.01);
(Continued)

(58) Field of Classification Search
CPC ....................................................... G06N 3/08
See application file for complete search history.

(56) References Cited

U.S. PATENT DOCUMENTS 8,532,365 B2    9/2013 Tate ............................. 382/147
8,675,974 B2    3/2014 Iio et al. ...................... 382/225
(Continued)

FOREIGN PATENT DOCUMENTS

| CN | 106250874 | 12/2016 |
| JP | 2013-506198 | 2/2013 |

(Continued)

OTHER PUBLICATIONS

Office Action dated Sep. 10, 2021 in counterpart Japanese Application No. 2017-154728, together with English translation thereof.
(Continued)

*Primary Examiner* — Edward Park
(74) *Attorney, Agent, or Firm* — Venable LLP

(57) ABSTRACT

A connected layer feature is generated by connecting outputs of a plurality of layers of a hierarchical neural network obtained by processing an input image using the hierarchical neural network. An attribute score map representing an attribute of each region of the input image is generated for each attribute using the connected layer feature. A recognition result for a recognition target is generated and output by integrating the generated attribute score maps for respective attributes.

20 Claims, 24 Drawing Sheets

(51) Int. Cl.
| | |
|---|---|
| *G06F 18/24* | (2023.01) |
| *G06N 3/08* | (2023.01) |
| *G06T 7/11* | (2017.01) |
| *G06T 7/143* | (2017.01) |
| *G06T 7/194* | (2017.01) |
| *G06T 7/60* | (2017.01) |
| *G06T 7/70* | (2017.01) |
| *G06V 40/10* | (2022.01) |
| *G06V 40/16* | (2022.01) |
| *G06V 20/00* | (2022.01) |

(52) U.S. Cl.
CPC .. *G06V 40/161* (2022.01); *G06T 2207/10024* (2013.01); *G06T 2207/20021* (2013.01); *G06T 2207/20076* (2013.01); *G06T 2207/20081* (2013.01); *G06T 2207/20084* (2013.01); *G06T 2207/30201* (2013.01); *G06V 20/35* (2022.01)

(56) References Cited

U.S. PATENT DOCUMENTS

| | | | |
|---|---|---|---|
| 8,755,611 B2 | 6/2014 | Tate et al. | 382/218 |
| 8,768,944 B2 | 7/2014 | Yoshii et al. | 707/758 |
| 10,733,482 B1 | 8/2020 | Lee et al. | G06K 9/6277 |
| 11,256,955 B2* | 2/2022 | Tate | G06T 7/70 |
| 2011/0075917 A1 | 3/2011 | Cerosaletti et al. | 382/159 |
| 2016/0133054 A1 | 5/2016 | Honjo et al. | 345/633 |
| 2016/0358338 A1 | 12/2016 | Tsunoda | G06T 7/0081 |
| 2017/0083796 A1 | 3/2017 | Kim et al. | G06K 9/6267 |
| 2017/0124415 A1 | 5/2017 | Choi et al. | G06K 9/46 |
| 2017/0132758 A1 | 5/2017 | Paluri et al. | G06T 7/246 |
| 2018/0039879 A1 | 2/2018 | Shaji et al. | G06K 9/036 |
| 2018/0114079 A1 | 4/2018 | Myers et al. | G06K 9/66 |
| 2018/0225554 A1 | 8/2018 | Tawari et al. | G06K 9/70 |
| 2019/0050681 A1 | 2/2019 | Tate | G06K 9/6232 |
| 2019/0073553 A1* | 3/2019 | Yao | G06K 9/6256 |

FOREIGN PATENT DOCUMENTS

| | | |
|---|---|---|
| JP | 2013-235578 | 11/2013 |
| JP | 2017-005389 | 1/2017 |
| JP | 2017-059207 | 3/2017 |
| WO | 2011/037862 | 3/2011 |

OTHER PUBLICATIONS

Shaoqing Ren, Kaiming He, Ross Girshick, Jian Sun, Faster R-CNN: Towards Real-Time Object Detection with Region Proposal Networks, NIPS 2015.

M.D. Zeiler, R. Fergus, Visualizing and Understanding Convolutional Networks, ECCV 2014.

Hyeonwoo Noh, Seunghoon Hong, Bohyung Han, Learning Deconvolution Network for Semantic Segmentation, ICCV 2015.

A. Krizhevsky et al., ImageNet Classification with Deep Convolutional Neural Networks, NIPS 2012.

Emmanouil Z. Psarakis and Georgios D. Evangelidis, An Enhanced Correlation-Based Method for Stereo Correspondence with Sub-Pixel Accuracy, ICCV 2005.

Wei Luo, XiaogangWang, Xiaoou Tang, Content-Based Photo Quality Assessment, ICCV 2011.

Lazebnik, Schmid, Ponce, Beyond Bags of Features: Spatial Pyramid Matching for Recognizing Natural Scene Categories, CVPR 2006.

Tao Kong et al., "HyberNet: Towars Accurate Region Proposal Generation and Joint Object Detection", 2016 IEEE Conference on Computer Vision and Pattern Reccognition (CVPR), IEEE, pp. 845-853, Jun. 27, 2016.

Office Action dated Apr. 14, 2023 in counterpart Japanese Application No. 2022-153997, together with English translation thereof.

* cited by examiner

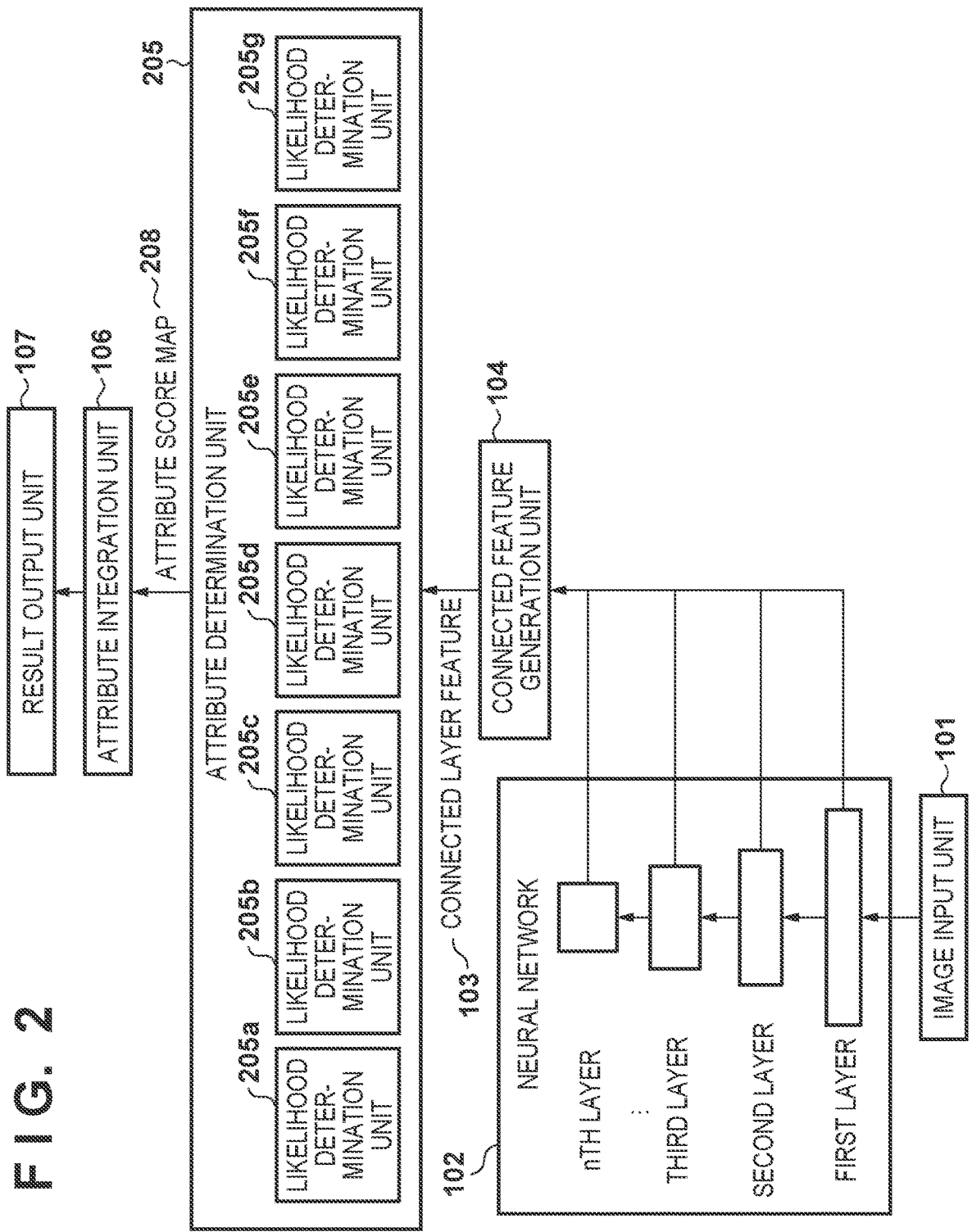

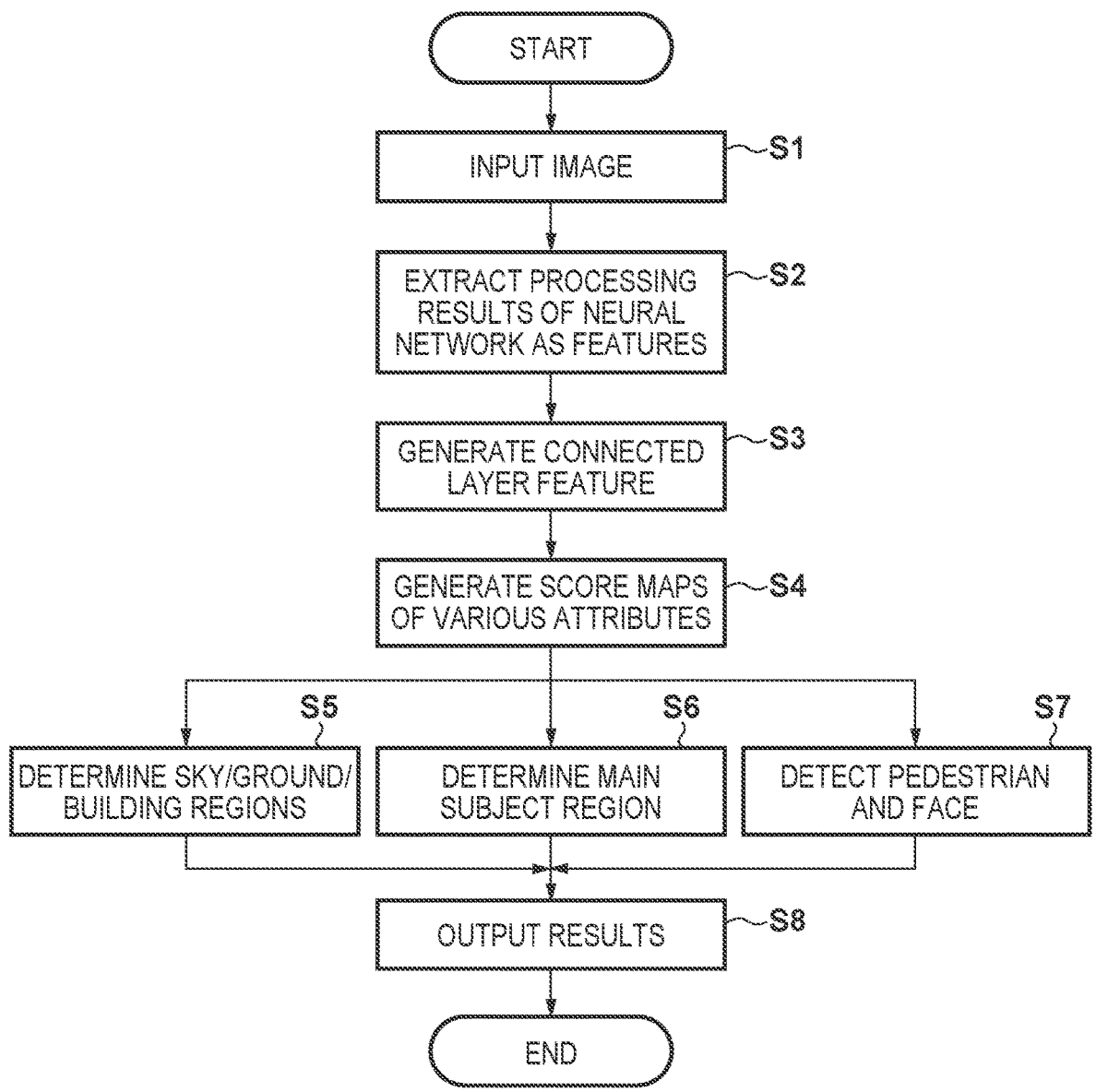

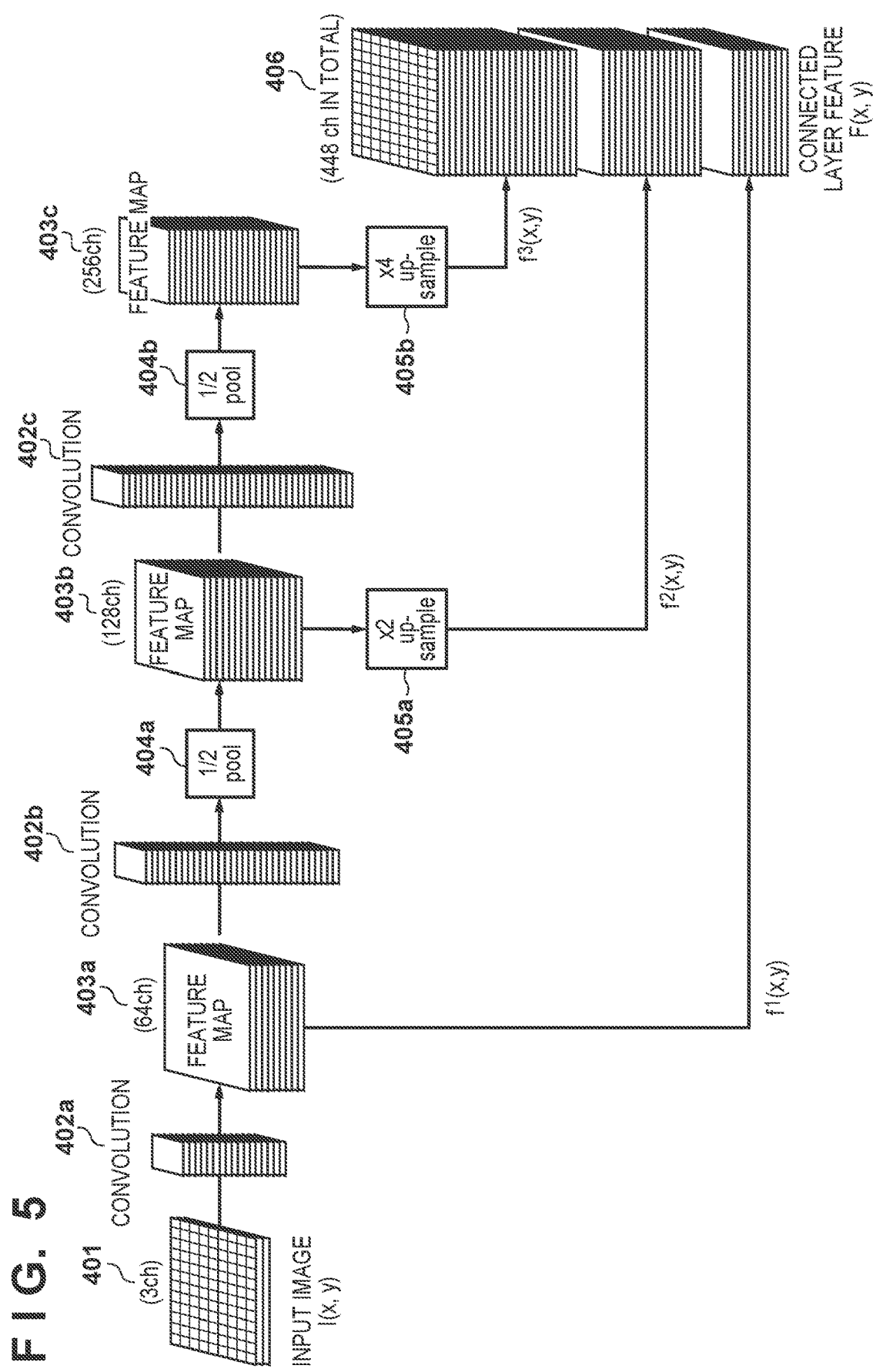

FIG. 7A

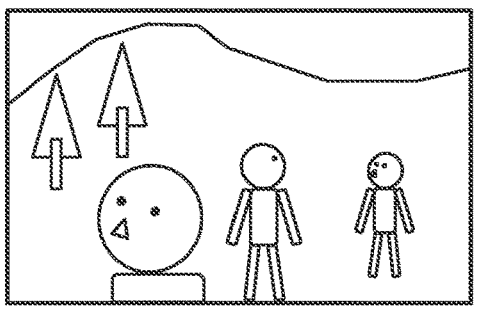

FIG. 7B

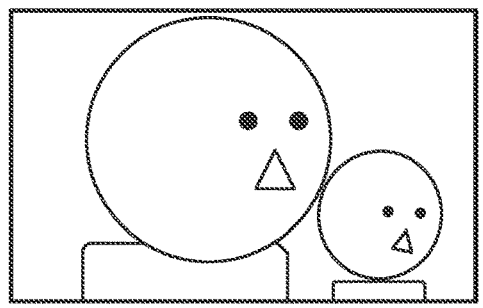

FIG. 7C

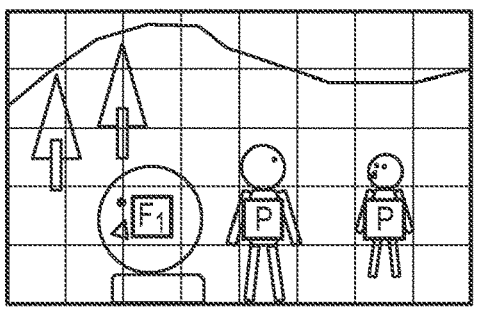

EXPLANATORY NOTES OF SYMBOL OF
SUPERVISORY VALUE OF OBJECT

- [P] REFERENCE POINT OF PEDESTRIAN
- [F₁] REFERENCE POINT OF FACE (SMALL)
- [F₂] REFERENCE POINT OF FACE (LARGE)

FIG. 7D

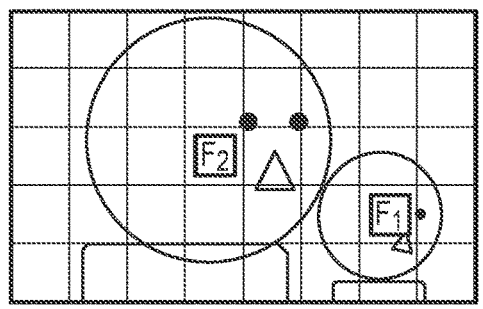

EXPLANATORY NOTES OF SYMBOL OF
SUPERVISORY VALUE OF OBJECT

- [P] REFERENCE POINT OF PEDESTRIAN
- [F₁] REFERENCE POINT OF FACE (SMALL)
- [F₂] REFERENCE POINT OF FACE (LARGE)

FIG. 7E

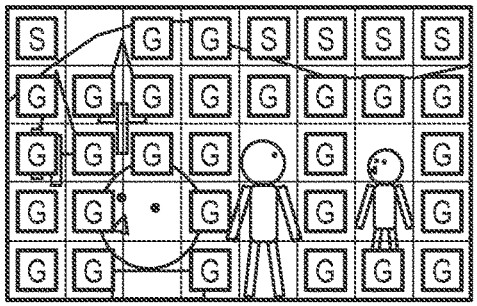

EXPLANATORY NOTES OF SYMBOL OF
SUPERVISORY VALUE OF REGION

- [S] SKY REGION
- [G] GROUND REGION
- [B] BUILDING REGION
- [M] MAIN SUBJECT REGION

FIG. 7F

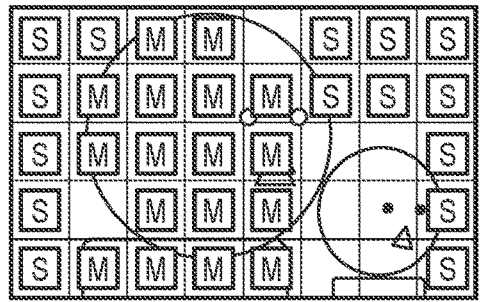

EXPLANATORY NOTES OF SYMBOL OF
SUPERVISORY VALUE OF REGION

- [S] SKY REGION
- [G] GROUND REGION
- [B] BUILDING REGION
- [M] MAIN SUBJECT REGION

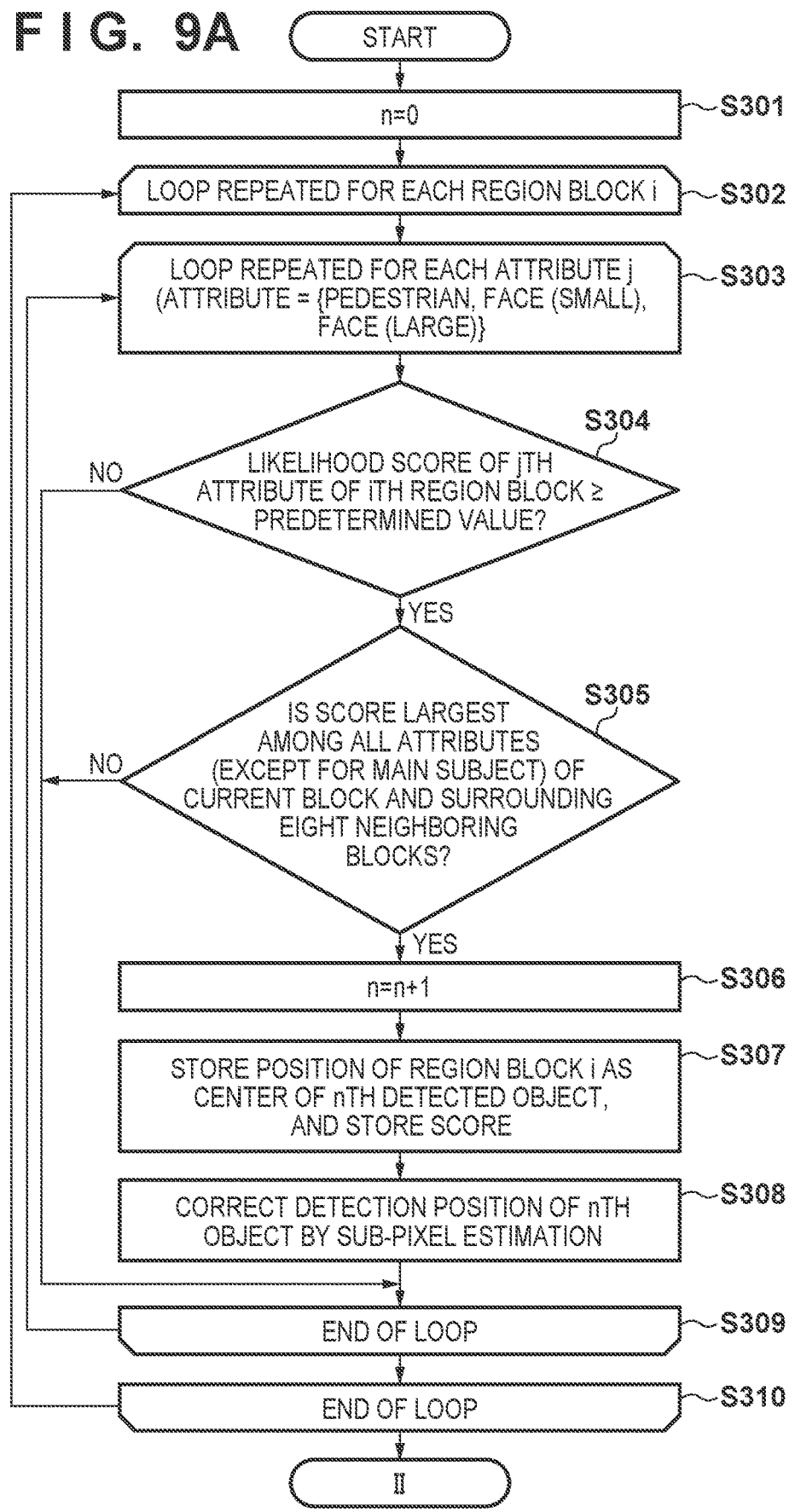

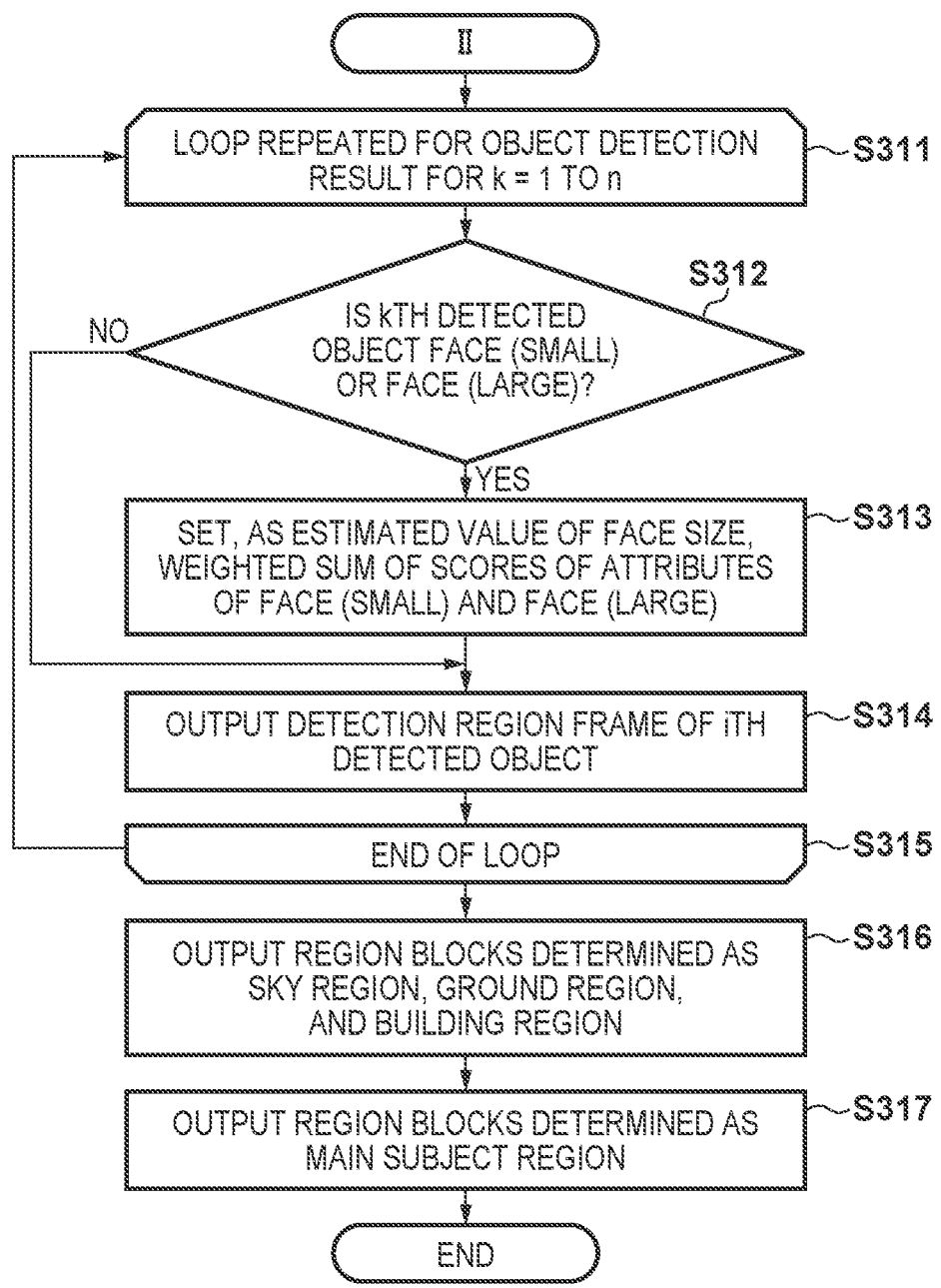

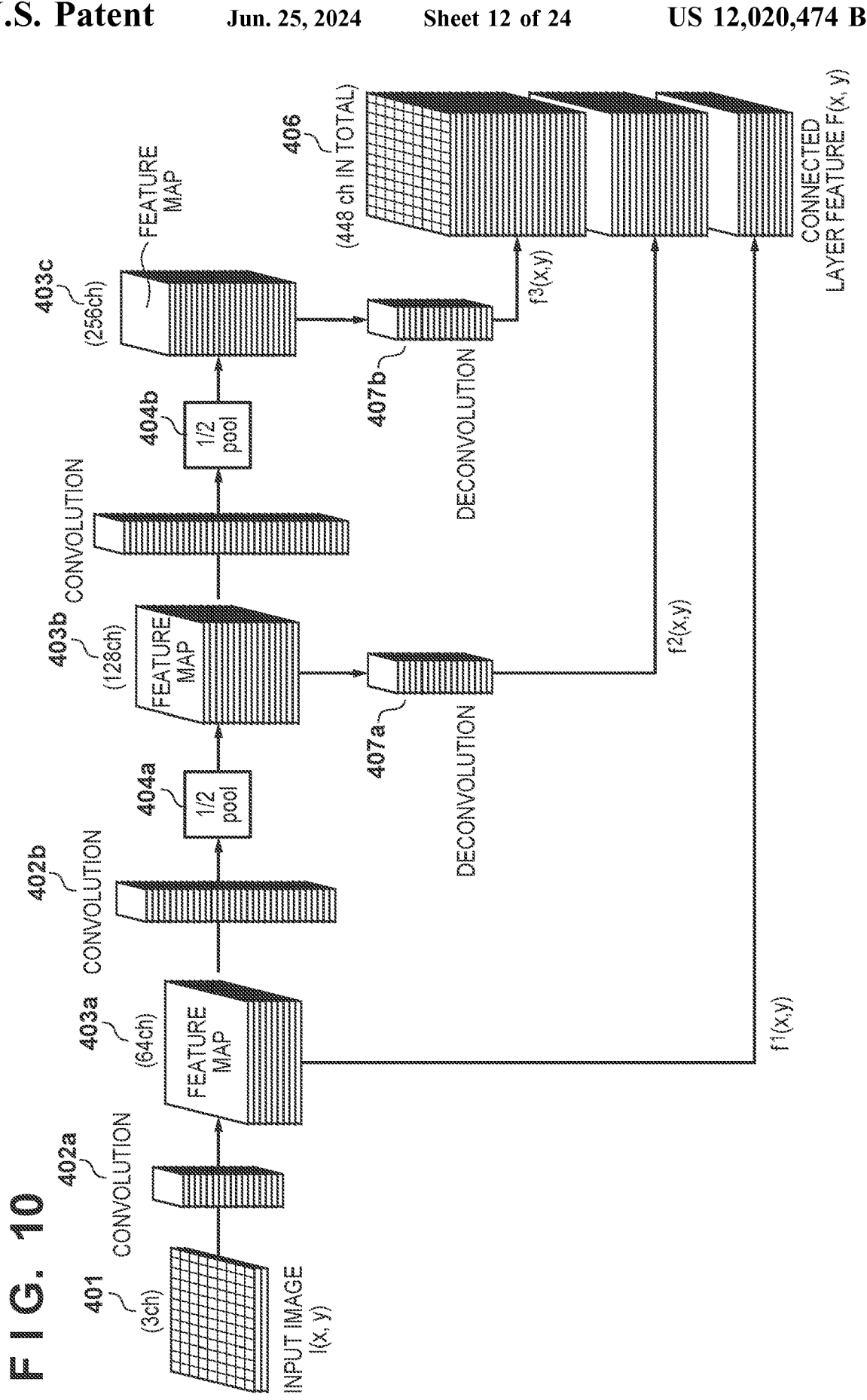

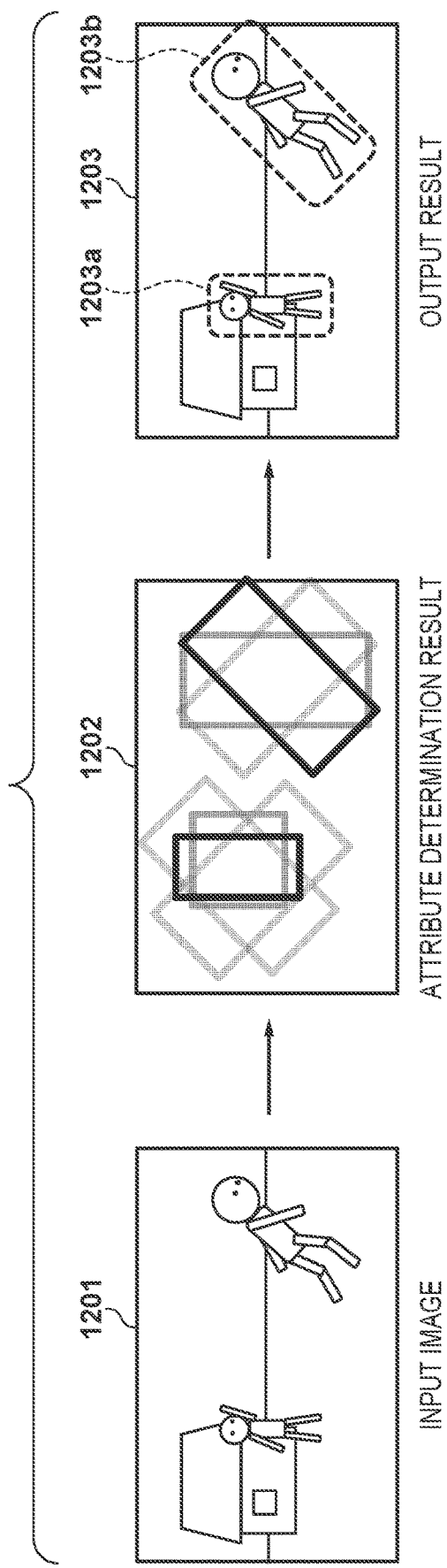

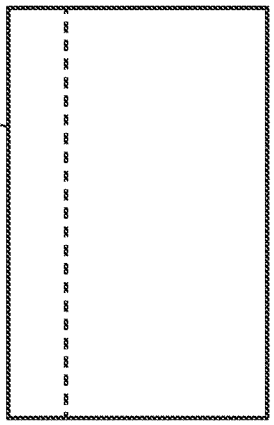
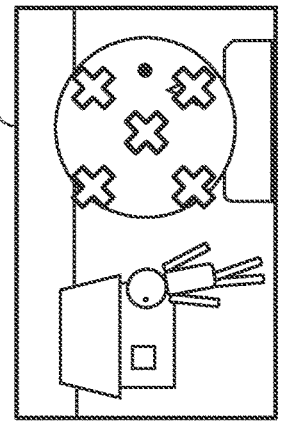
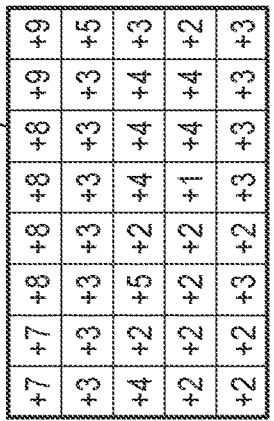
FIG. 16A
FIG. 16B
FIG. 16C

IMAGE PROCESSING APPARATUS, IMAGE PROCESSING METHOD, AND NON-TRANSITORY COMPUTER-READABLE STORAGE MEDIUM

This application is a continuation of application Ser. No. 16/053,473 filed Aug. 2, 2018, currently pending; and claims priority under 35 U.S.C. § 119 to Japan Application JP 2017-154728 filed in Japan on Aug. 9, 2017; and the contents of all of which are incorporated herein by reference as if set forth in full.

BACKGROUND OF THE INVENTION

Field of the Invention

The present invention relates to a recognition technique.

Description of the Related Art

There is known a technique of extracting a feature amount from video data and determining a subject in the video data using a discriminator. An example of this technique is a convolutional neural network (to be referred to as a CNN hereinafter) as a kind of neural network. The CNN has the property of sequentially performing local convolution arithmetic processing in a plurality of stages.

In a technique described in Shaoqing Ren, Kaiming He, Ross Girshick, Jian Sun, Faster R-CNN: Towards Real-Time Object Detection with Region Proposal Networks, NIPS 2015, an object is detected by applying a CNN to image data. More specifically, (1) an image undergoes arithmetic processing by a CNN. Furthermore, (2) the feature amounts of the final layer of a CNN are totaled for each region of interest, and an object is determined. This processing is performed for all regions of interest.

In the conventional method described in Shaoqing Ren, Kaiming He, Ross Girshick, Jian Sun, Faster R-CNN: Towards Real-Time Object Detection with Region Proposal Networks, NIPS 2015, features are totaled for each region of interest. Therefore, if there are many candidate regions of an object or a plurality of recognition tasks are performed simultaneously, the calculation cost is high.

SUMMARY OF THE INVENTION

The present invention has been made in consideration of the above problem, and provides a technique for robustly performing recognition processing at high speed for, for example, a size and orientation without executing conventional processing requiring high calculation cost.

According to the first aspect of the present invention, there is provided an image processing apparatus comprising: a feature generation unit configured to generate a connected layer feature by connecting outputs of a plurality of layers of a hierarchical neural network obtained by processing an input image using the hierarchical neural network; a map generation unit configured to generate, for each attribute, an attribute score map representing an attribute of each region of the input image using the connected layer feature; and an output unit configured to generate and output a recognition result for a recognition target by integrating the attribute score maps for respective attributes generated by the map generation unit.

According to the second aspect of the present invention, there is provided an image processing method comprising: generating a connected layer feature by connecting outputs of a plurality of layers of a hierarchical neural network obtained by processing an input image using the hierarchical neural network; generating, for each attribute, an attribute score map representing an attribute of each region of the input image using the connected layer feature; and generating and outputting a recognition result for a recognition target by integrating the generated attribute score maps for respective attributes.

According to the third aspect of the present invention, there is provided a non-transitory computer-readable storage medium storing a computer program for causing a computer to function as: a feature generation unit configured to generate a connected layer feature by connecting outputs of a plurality of layers of a hierarchical neural network obtained by processing an input image using the hierarchical neural network; a map generation unit configured to generate, for each attribute, an attribute score map representing an attribute of each region of the input image using the connected layer feature; and an output unit configured to generate and output a recognition result for a recognition target by integrating the attribute score maps for respective attributes generated by the map generation unit.

Further features of the present invention will become apparent from the following description of exemplary embodiments with reference to the attached drawings.

BRIEF DESCRIPTION OF THE DRAWINGS

FIG. 2 is a block diagram showing an example of the functional arrangement of an image processing apparatus;

FIG. 3 is a flowchart illustrating recognition processing performed by the image processing apparatus;

FIG. 5 is a view showing the arithmetic processing of each layer;

FIGS. 7A to 7F are views showing examples of learning data;

FIGS. 9A and 9B are flowcharts each illustrating an attribute integration procedure related to object detection;

FIG. 10 is a view for explaining a modification of the first embodiment;

FIG. 13 is a view showing an attribute determination example and a result output example;

FIGS. 16A to 16C are views respectively showing horizontal line information values, in-focus information values, and photometry information values;

DESCRIPTION OF THE EMBODIMENTS

Figure 1:
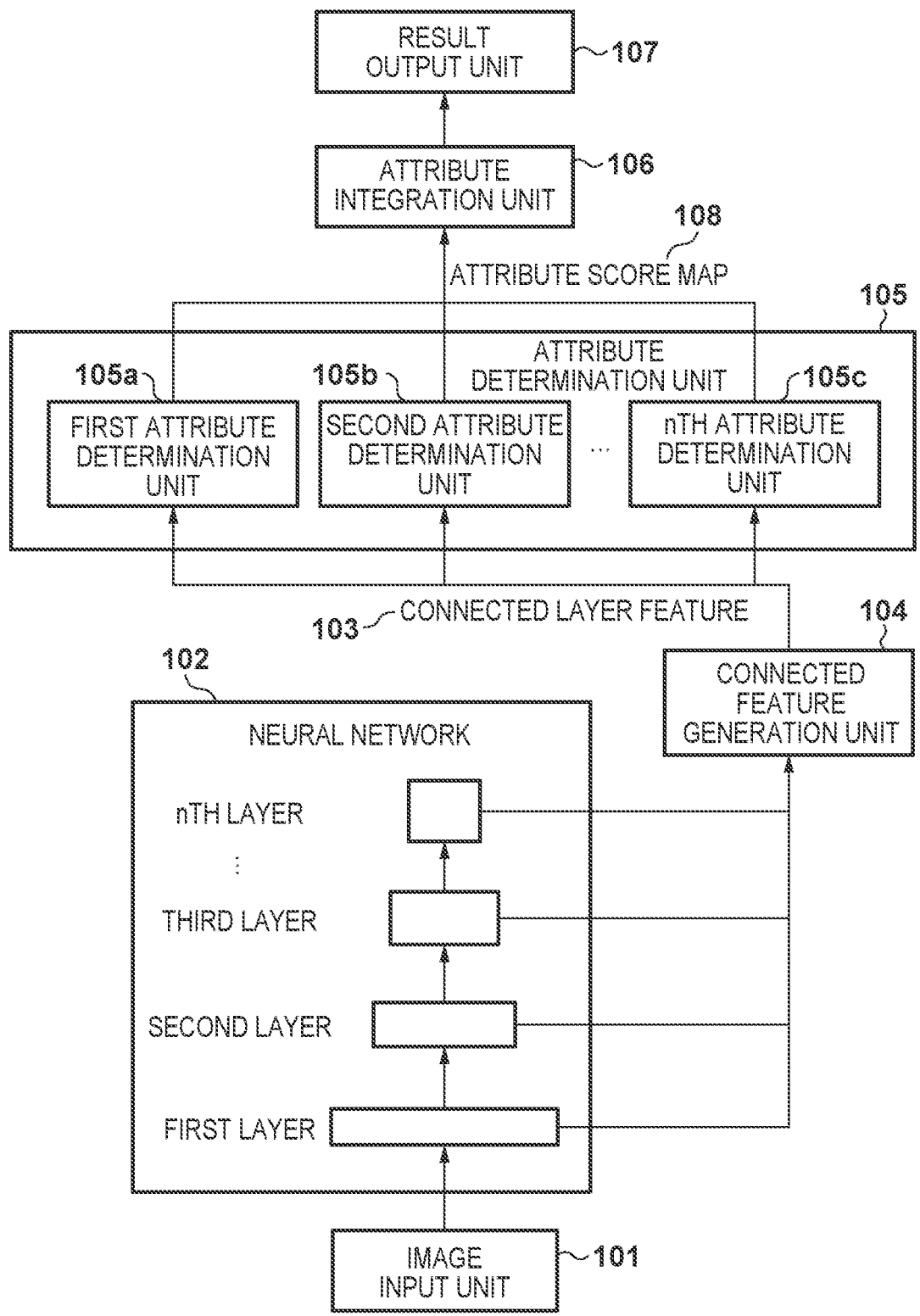
FIG. 1 is a block diagram showing an example of the functional arrangement of an image processing apparatus.

The embodiments of the present invention will now be described with reference to the accompanying drawings. Note that the embodiments to be described below are examples of detailed implementation of the present invention or detailed examples of the arrangement described in the appended claims.

First Embodiment

An example of the functional arrangement of an image processing apparatus that performs image recognition for an input image will be described first with reference to the block diagram of FIG. 1. An image input unit 101 inputs an input image including one or more objects as recognition targets (detection targets). A neural network 102 is a hierarchical neural network including the first to nth (n is a natural number of 2 or more) layers, and processes the input image input by the image input unit 101. A connected feature generation unit 104 performs feature generation processing of generating a connected layer feature 103 by connecting the outputs (feature maps) of defined layers in the neural network 102. An attribute determination unit 105 includes first to nth attribute determination units 105a to 105c. Each of the first to nth attribute determination units 105a to 105c generates a likelihood map (attribute score map 108) of a corresponding attribute using the connected layer feature 103, and outputs it. An attribute integration unit 106 integrates the attribute score maps 108 to generate a defined recognition result such as an object detection result or scene recognition result for the input image. A result output unit 107 outputs the recognition result obtained by the attribute integration unit 106.

An example of detailed image recognition processing using the image processing apparatus will be described below. As attributes for obtaining the attribute score maps 108, seven kinds of attributes, that is, a pedestrian, small face, large face, sky, ground, building, and main subject are used. In this case, as shown in FIG. 2, the attribute determination unit 105 of FIG. 1 is formed as an attribute determination unit 205 that performs map generation of the attribute score maps 108 of the seven kinds of attributes. That is, an image processing apparatus with a functional arrangement example shown in FIG. 2 is used.

Referring to FIG. 2, n=7 is set in FIG. 1 to replace the first to seventh attribute determination units 105a to 105c by likelihood determination units 205a to 205g, respectively. The likelihood determination unit 205a generates an attribute score map 208 for the attribute "pedestrian". The likelihood determination unit 205b generates an attribute score map 208 for the attribute "small face". The likelihood determination unit 205c generates an attribute score map 208 for the attribute "large face". The likelihood determination unit 205d generates an attribute score map 208 for the attribute "sky". The likelihood determination unit 205e generates an attribute score map 208 for the attribute "ground". The likelihood determination unit 205f generates an attribute score map 208 for the attribute "building". The likelihood determination unit 205g generates an attribute score map 208 for the attribute "main subject".

Recognition processing performed by the image processing apparatus shown in FIG. 2 for one input image will be described next with reference to the flowchart of FIG. 3.

In step S1, the image input unit 101 inputs an input image. In step S2, the neural network 102 processes the input image input by the image input unit 101 in step S1, and the connected feature generation unit 104 extracts the outputs (feature maps) of the defined layers in the neural network 102. In step S3, the connected feature generation unit 104 generates the connected layer feature 103 by connecting the outputs (feature maps) of the defined layers extracted in step S3. In step S4, the likelihood determination units 205a to 205g of the attribute determination unit 205 respectively generate the attribute score maps 208 of the pedestrian, small face, large face, sky, ground, building, and main subject using the connected layer feature 103.

In step S5, the attribute integration unit 106 integrates the attribute score maps 208 respectively generated by the likelihood determination units 205a to 205g, and determines sky, ground, and building regions in the input image. In step S6, the attribute integration unit 106 integrates the attribute score maps 208 respectively generated by the likelihood determination units 205a to 205g, and determines a main subject region in the input image. In step S7, the attribute integration unit 106 integrates the attribute score maps 208 respectively generated by the likelihood determination units 205a to 205g, and detects a pedestrian and face in the input image. In step S8, the result output unit 107 outputs the determination results and detection result obtained by the attribute integration unit 106 in step S5 to S7. The output destination of the result output unit 107 is not limited to a specific output destination.

Figure 4A:
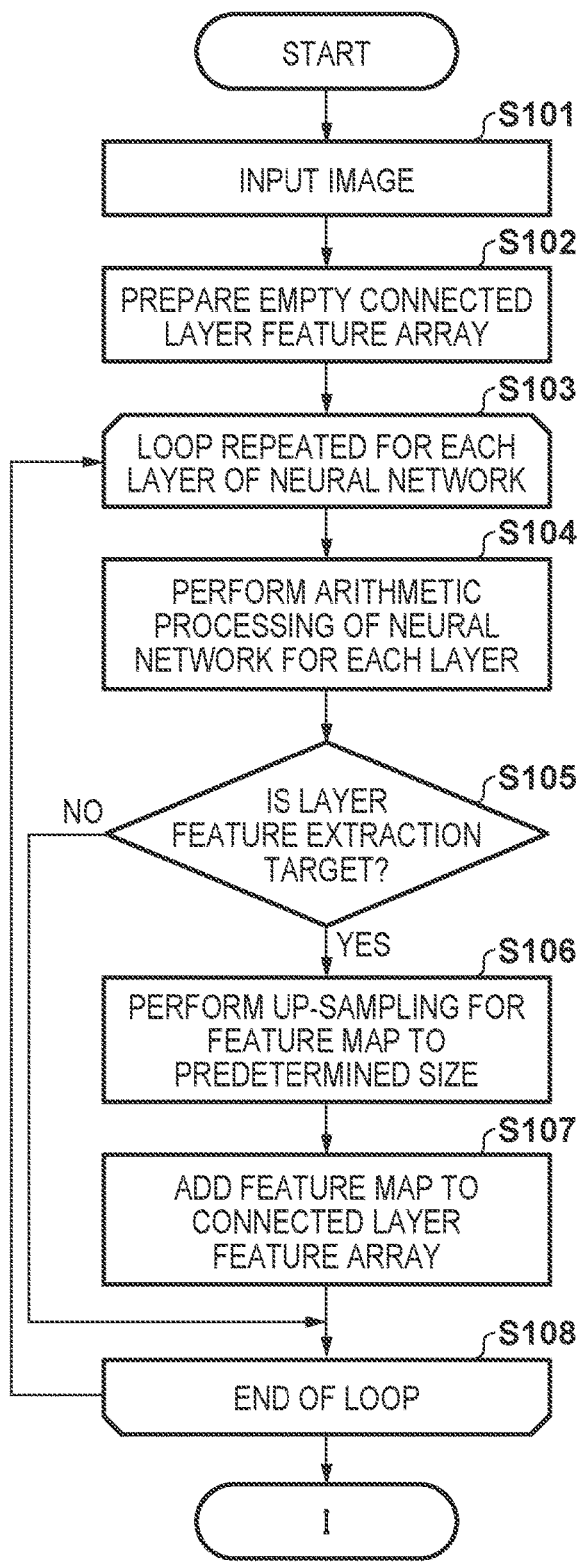
FIGS. 4A and 4B are flowcharts illustrating processes in steps S1 to S4.

The processes in steps S1 to S3, that is, processing from input of an input image to generation of the connected layer feature 103 will be described in detail with reference to the flowchart of FIG. 4A.

In step S101, the image input unit 101 inputs an input image. In step S102, the connected feature generation unit 104 initializes an array (connected layer feature array) for registering the outputs (feature maps) of the defined layers of the neural network 102 (prepares an empty array by setting a value such as a null value in each element of an array). The processes in steps S103 to S108 are performed for each of the first to nth layers of the neural network 102. A CNN will be used as the neural network 102 below. The CNN may use only a layer called a convolution layer without using a layer called a fully connected layer.

In step S104, the neural network 102 performs arithmetic processing of a layer of interest. In step S104 of the first time, arithmetic processing of the first layer is performed. In step S104 of the second time, arithmetic processing of the second layer is performed. In step S104 of the nth time, arithmetic processing of the nth layer is performed. The neural network 102 performs arithmetic processing in step S104 for each layer, thereby implementing arithmetic processing of each layer shown in FIG. 5.

The neural network 102 according to this embodiment performs arithmetic processing of each layer shown in FIG. 5. FIG. 5 exemplifies the neural network 102 of three layers but the number of layers is not limited to three.

To perform convolution filter processing for an input image 401 a plurality of times, the neural network 102 performs convolution filter processes 402a, 402b, and 402c in the respective layers. In each layer, the neural network 102 further performs activation function processing after the convolution filter processing (not shown in FIG. 5). In each layer except for the first layer, the neural network 102 performs pooling processing 404a or 404b after the activation function processing. The convolution filter processing and the activation function processing are performed in the Lth (L=1, 2, 3 in FIG. 5) layer in accordance with $$f^L(x,y,\text{CHOUT}) = \theta(\Sigma_{\text{CHIN}} \Sigma_{\Delta x, \Delta y = -K + K} w^L(\Delta x, \Delta y, \text{CHIN}, \text{CHOUT}) \times f^{L-1}(x + \Delta x, y + \Delta x, \text{CHIN}) + B^L_{\text{CHOUT}})$$

$f^L$(x, y, z) represents a feature map output from the Lth layer and including z maps. A number having a unit of ch in FIG. 5 indicates the number of feature maps. For example, in the case of FIG. 5, a feature map 403a includes 64 maps, a feature map 403b includes 128 maps, and a feature map 403c includes 256 maps.

θ(•) represents an activation function formed by a half-wave rectifier. $w^L$(Δx, Δy, CHIN, CHOUT) (Δx, Δy∈{−K, . . . , K}) represents a weight parameter of convolution of the Lth layer, and $B^L_{\text{CHOUT}}$ represents a bias term of the Lth layer. CHIN represents the number of a feature map output from the (L−1)th layer, and CHOUT represents the number of a feature map output from the Lth layer. Note that in the above equation, an input image I(x, y) formed from three R, G, and B channels is dealt with as a feature map $f^0$(x, y, z).

Note that convolution processing is performed after filling pixels around the feature amp $f^{L-1}$ with 0 values so that sizes in the x and y directions of the feature map remain the same before and after convolution (which is called padding processing).

The pooling processing 404a or 404b is processing of reducing the size of a map by representing the feature map by a representative value for each predetermined local region. The pooling processing has the effect of making the recognition performance of the CNN robust and has the property in which the resolution of a result decreases. In the example shown in FIG. 5, the pooling processing 404a or 404b is processing of reducing the feature map to that having a ½ resolution by integrating each group of 2×2 pixels.

The above arithmetic processing generates the feature map 403a, 403b, or 403c in the stage of each layer of the CNN. The above technique is a general technique related to the CNN, and is widely known by Shaoqing Ren, Kaiming He, Ross Girshick, Jian Sun, Faster R-CNN: Towards Real-Time Object Detection with Region Proposal Networks, NIPS 2015, M. D. Zeiler, R. Fergus, Visualizing and Understanding Convolutional Networks, ECCV 2014, Hyeonwoo Noh, Seunghoon Hong, Bohyung Han, Learning Deconvolution Network for Semantic Segmentation, ICCV 2015, and the like, and a more detailed description thereof will be omitted.

Note that the CNN learns in advance the weight parameter by a classification task using a large scale database, that is performed in A. Krizhevsky et al., ImageNet Classification with Deep Convolutional Neural Networks, NIPS 2012. As a result, as the feature map 403a of the low layer close to the input image of the CNN, a map that responds well to a simple pattern such as a gradient of a line segment in the image is generated. As the feature map 403c of the high layer of the succeeding stage, image patterns in a wider range are aggregated to generate a map that responds to a complicated pattern shape. The above property of the CNN is widely known by M. D. Zeiler, R. Fergus, Visualizing and Understanding Convolutional Networks, ECCV 2014 and the like.

Referring back to FIG. 4A, in step S105, the connected feature generation unit 104 determines whether the layer of interest is a predetermined defined layer (a layer that outputs a feature map) among the layers in the neural network 102. That is, the connected feature generation unit 104 determines whether a feature map as a result of performing arithmetic processing by the neural network 102 is the result of the defined layer. If, as a result of the determination processing, the layer of interest is the defined layer, the process advances to step S106; otherwise, the next layer is set as a layer of interest and the process returns to step S103.

In step S107, the connected feature generation unit 104 additionally registers, in the above array, the feature map as the output of the layer of interest. By repeating this processing, a high-dimensional connected layer feature (array) is finally obtained by connecting a plurality of feature maps. In the example shown in FIG. 5, a connected layer feature 406 (F(x, y)) of 448 ch is obtained by connecting the feature maps $f^1$(x, y), $f^2$(x, y), and $f^3$(x, y). The connected layer feature F is generally represented by:

$$F(x,y) = [f^1(x,y)^T, f^2(x,y)^T, \ldots, f^n(x,y)^T]^T$$

where $f^1$, $f^2$, . . . , $f^n$ respectively represent feature maps extracted from the neural network 102. The connected layer feature F is obtained by connecting the feature maps in the Z-dimensional direction. x and y represent the coordinates of a pixel of the feature map.

Note that since the CNN generally performs pooling processing, the resolution of the feature map is different for each layer. Therefore, before step S107, in step S106, the connected feature generation unit 104 matches, to the defined resolution, the resolution of the feature map to be registered in the above array. In the example of FIG. 5, the vertical and horizontal resolutions of the feature map 403b are ½ the vertical and horizontal resolutions of the feature map 403a (input image 401), and the vertical and horizontal resolutions of the feature map 403c are ½ the vertical and horizontal resolutions of the feature map 403b. In this case, the connected feature generation unit 104 sets the feature map $f^1$(x, y) without performing resolution conversion for the feature map 403a. The connected feature generation unit 104 performs up-sampling processing 405a of doubling the vertical and horizontal sizes (resolutions) for the feature map 403b to match the vertical and horizontal sizes (resolutions) of the feature map 403b to those of the feature map 403a (input image 401). A feature map $f^2$(x, y) is obtained by "matching the vertical and horizontal sizes (resolutions) of the feature map 403b to those of the feature map 403a (input image 401)". Size conversion (resolution conversion) by the up-sampling processing can be implemented by adopting a general method such as copy of pixel values or linear interpolation. Furthermore, the connected feature generation unit 104 performs up-sampling processing 405b of quadrupling the vertical and horizontal sizes (resolutions) for the feature map 403c to match the vertical and horizontal sizes (resolutions) of the feature map 403c to those of the feature map 403a (input image 401). A feature map $f^3$(x, y) is obtained by "matching the vertical and horizontal sizes (resolutions) of the feature map 403c to those of the feature map 403a (input image 401)".

Note that down-sampling processing may be performed instead of the up-sampling processing depending on the matching size. With this processing, the feature maps $f^1$(x, y), $f^2$(x, y), and $f^3$(x, y) have the resolutions equal to that of the input image I (x, y). Then, the feature maps $f^1$(x, y), $f^2$(x, y), and $f^3$(x, y) are connected to obtain the connected layer feature 406 (F(x, y)).

Note that in this embodiment, the resolution of the input image I(x, y) is equal to that of the connected layer feature F(x, y). However, if the magnification of the up-sampling (down-sampling) processing is changed, a connected layer feature F'(x', y') of a resolution lower/higher than that of the input image I(x, y) can be generated. In the following description, a pixel of the connected layer feature F(x, y) will generally be referred to as a "region block" hereinafter.

The thus obtained connected layer feature is a feature obtained by integrating the plurality of feature maps from the low layer to the high layer of the neural network 102. Therefore, the feature amount includes various scales and kinds of information of various subjects. Each region block (x, y) corresponds to a high-dimensional feature vector. Because of the above two properties, the connected layer feature can be effectively used for various recognition tasks (a plurality of variations will be described in respective embodiments to show possible recognition tasks).

Figure 4B:
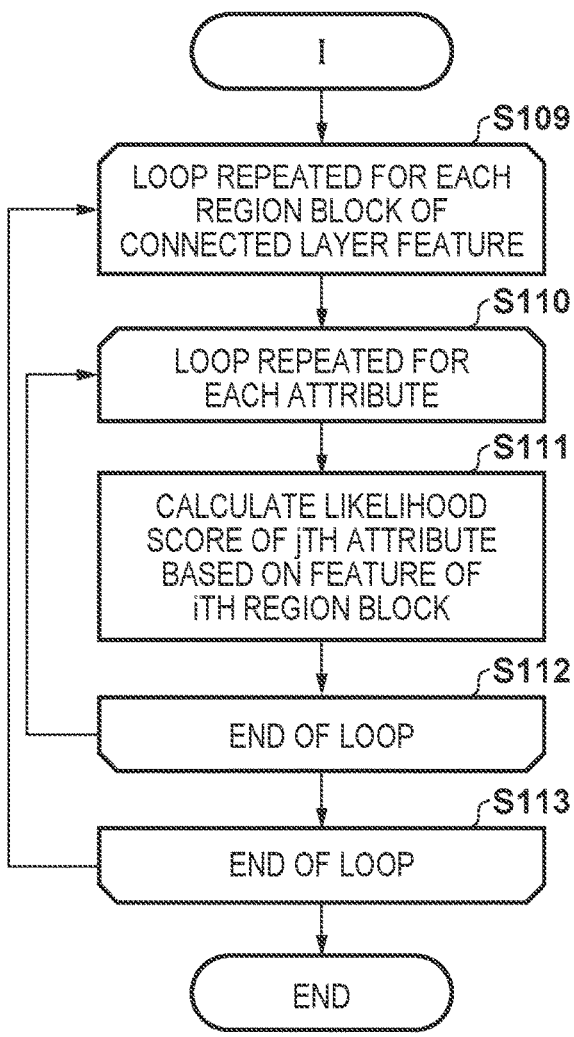

Details of the processing in step S4 above will be described with reference to the flowchart of FIG. 4B. Processes in steps S109 to S113 are performed for each region block of the connected layer feature. The processes in steps S110 to S112 are performed for each attribute (each of the seven kinds of attributes in this embodiment). As attributes determined in this embodiment, the presence/absence of three kinds of objects including a pedestrian, a small-size face, and a large-size face and likelihoods of four kinds of regions including a sky region, a ground region, a building region, and a main subject region are determined (the learning method of each discriminator will be described later).

The attribute determination unit 205 includes the likelihood determination units 205a to 205g serving as discriminators each of which is learned in advance so as to determine the likelihood of each attribute. As each discriminator, for example, a linear support vector machine (SVM) can be used. In step S111, the attribute determination unit 205 generates the attribute score map 208 of the jth ($1 \leq j \leq 7$) attribute with respect to the ith ($1 \leq i \leq I$: I represents the number of region blocks) region block in the connected layer feature. For example, for j=1, the likelihood determination unit 205a generates the attribute score map 208 of the attribute "pedestrian" with respect to the ith region block. For j=2, the likelihood determination unit 205b generates the attribute score map 208 of the attribute "small face" with respect to the ith region block. Fig j=3, the likelihood determination unit 205c generates the attribute score map 208 of the attribute "large face" with respect to the ith region block. For j=4, the likelihood determination unit 205d generates the attribute score map 208 of the attribute "sky" with respect to the ith region block. For j=5, the likelihood determination unit 205e generates the attribute score map 208 of the attribute "ground" with respect to the ith region block. For j=6, the likelihood determination unit 205f generates the attribute score map 208 of the attribute "building" with respect to the ith region block. For j=7, the likelihood determination unit 205g generates the attribute score map 208 of the attribute "main subject" with respect to the ith region block. Each attribute score map 208 is generated in accordance with the following equation. A likelihood score $L_j(x, y)$ of the jth attribute with respect to the region block at the coordinates (x, y) is given by:

$$L_j(x,y)=R(\Sigma_k \alpha_{jk} v_{jk} \cdot F(x,y)+b_j)$$

where $v_{jk}$ represents the kth support vector of the jth attribute discriminator, $\alpha_{jk}$ represents the weight coefficient of the support vector, $b_j$ represents a bias term, all of which are acquired in advance by learning. Furthermore, F(x, y) represents the feature vector of the region block at the coordinates (x, y), and R(•) represents a normalization function for converting the output of the SVM into a likelihood. Assume that the normalization function R(•) normalizes the score of the SVM to a value of 0 to 1 by performing approximation by the following function to lighten the processing.

The definition of normalization function z'=R(z) is given by:

$z'=1$ if $z \geq \tau$ $z'=z/\tau$ if $0 \leq z < \tau$ $z'=0$ if $z<0$

Note that $\tau$ represents an appropriate constant. As the attribute determination unit 205, a discriminator that performs light processing like a linear SVM in this embodiment is desirably used to perform determination processing for all the region blocks and all the attributes. In other words, as long as processing is light, any discriminator such as a decision tree or multilayer perceptron may be used.

In this embodiment, the feature amount F(x, y) of each region block (x, y) is used as the input feature of the attribute determination unit 205 to perform attribution determination. As another form, all feature amounts F(x+Δx, y+Δy) (Δx, Δy∈{−w, ..., −1, 0, 1, ... w}) in the range of a periphery w may be connected and determined as a feature amount. Various forms are applicable as the discriminator of the attribute determination unit 205 and the feature amount used for determination, and the present invention is not limited to them.

Figure 6A:
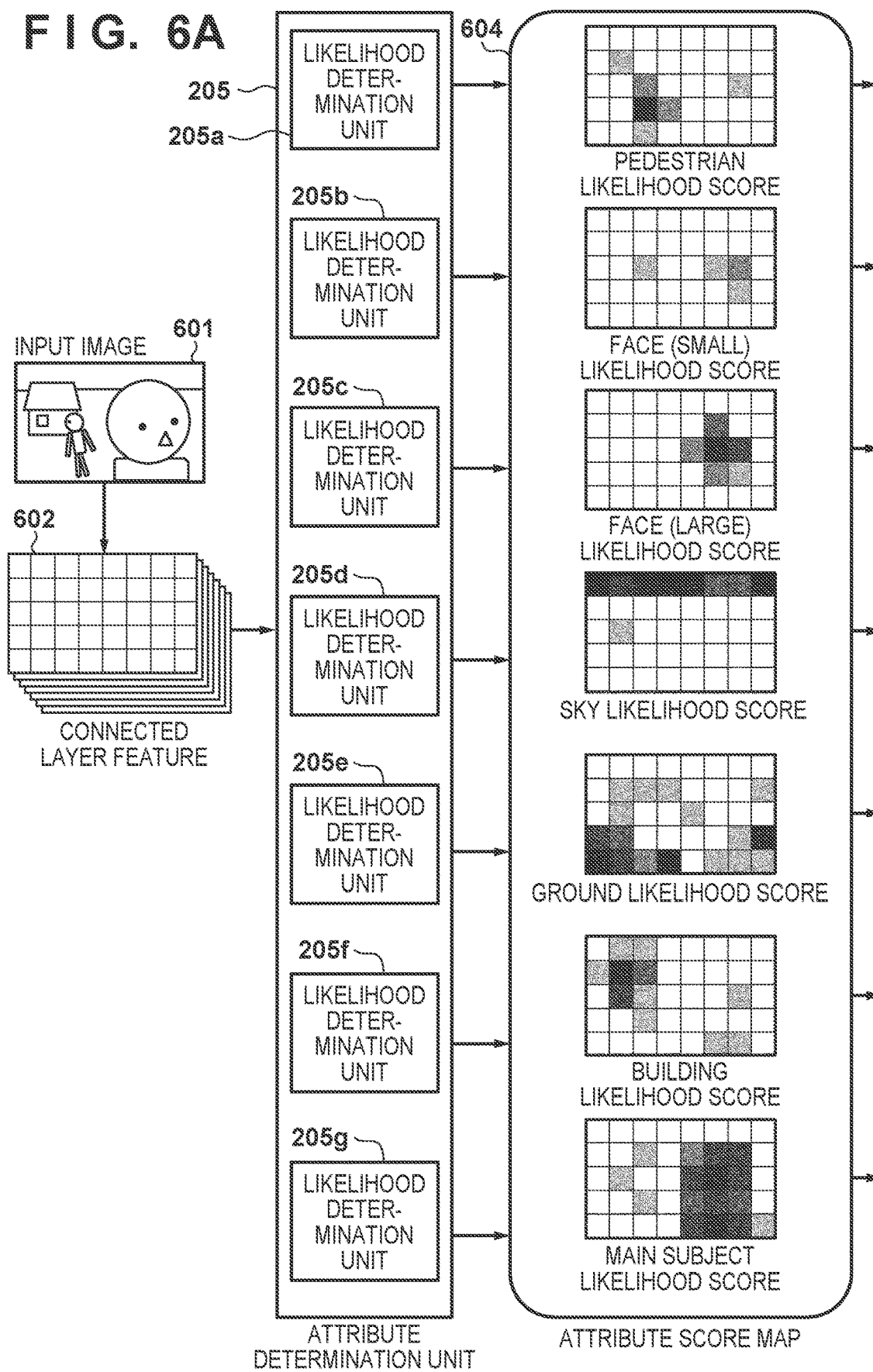
FIGS. 6A and 6B are views showing a processing result.
Figure 6B:
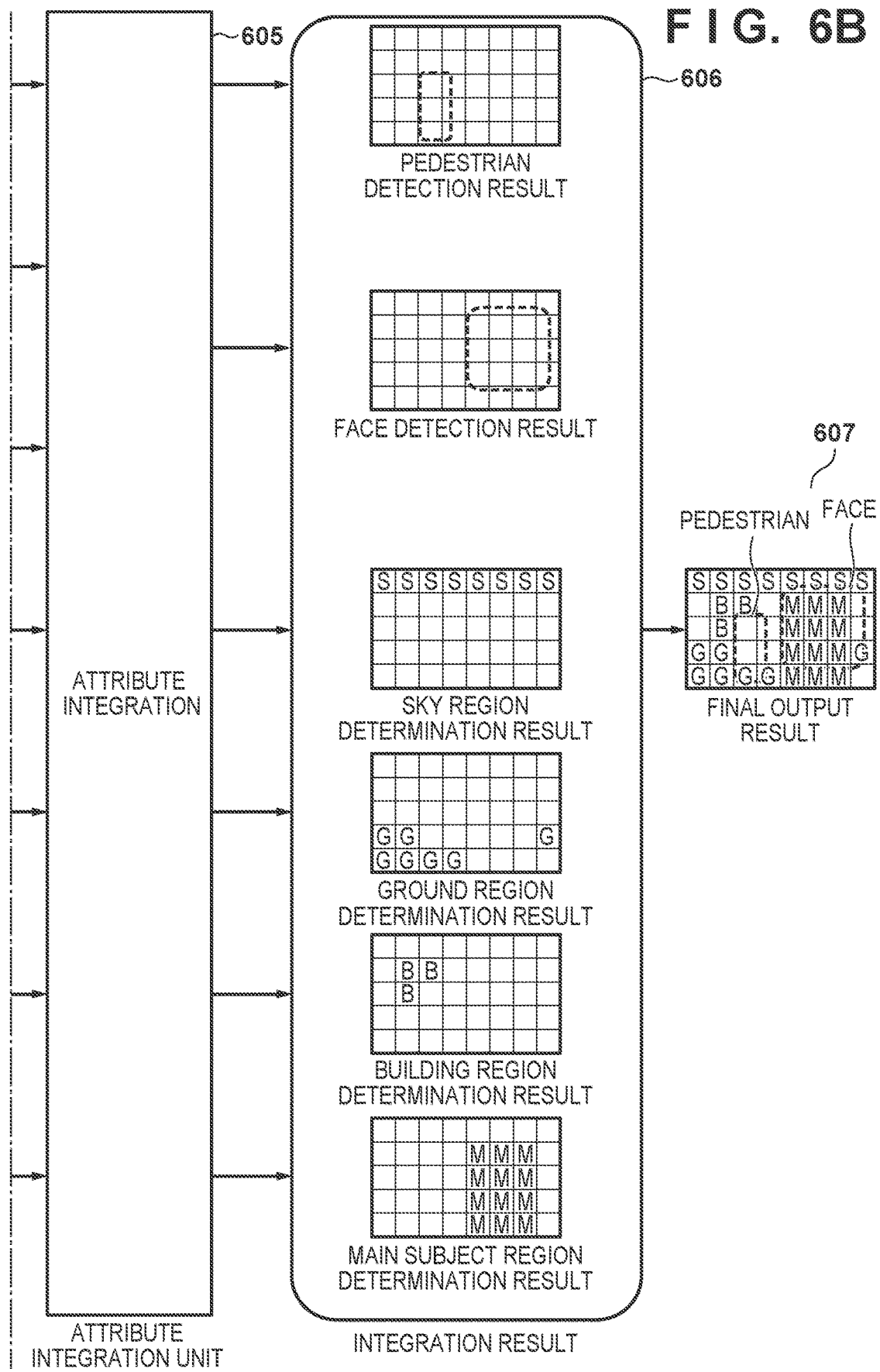

FIGS. 6A and 6B show the result of the above processing. As shown in FIGS. 6A and 6B, the likelihood determination units 205a to 205g of the attribute determination unit 205 can generate an attribute score map 604 of the attributes by performing attribute determination processing using a connected layer feature 602 of an input image 601. The attribute score map 604 includes an attribute score map obtained by mapping likelihood scores (pedestrian likelihood scores) of the attribute "pedestrian" obtained by the likelihood determination unit 205a for the respective region blocks. The attribute score map 604 includes an attribute score map obtained by mapping likelihood scores (face (small) likelihood scores) of the attribute "small face" obtained by the likelihood determination unit 205b for the respective region blocks. The attribute score map 604 includes an attribute score map obtained by mapping likelihood scores (face (large) likelihood scores) of the attribute "large face" obtained by the likelihood determination unit 205c for the respective region blocks. The attribute score map 604 includes an attribute score map obtained by mapping likelihood scores (sky likelihood scores) of the attribute "sky" obtained by the likelihood determination unit 205d for the respective region blocks. The attribute score map 604 includes an attribute score map obtained by mapping likelihood scores (ground likelihood scores) of the attribute "ground" obtained by the likelihood determination unit 205e for the respective region blocks. The attribute score map 604 includes an attribute score map obtained by mapping likelihood scores (building likelihood scores) of the attribute "building" obtained by the likelihood determination unit 205f for the respective region blocks. The attribute score map 604 includes an attribute score map obtained by mapping likelihood scores (main subject likelihood scores) of the attribute "main subject" obtained by the likelihood determination unit 205g for the respective region blocks. Referring to FIG. 6A, for each attribute, the region blocks are expressed in grayscales by setting black in a region block having a high likelihood score and white in a region block having a low likelihood score.

To obtain a determination result represented by the attribute score map 604 shown in FIG. 6A, the attribute determination unit 205 is learned, as follows. FIGS. 7A to 7F show examples of learning data used for learning of the attribute determination unit 205.

Each learning data is formed from a set of an image shown in FIG. 7A or 7B and supervisory values shown in FIGS. 7C and 7E or 7D and 7F. The supervisory values include two kinds of values, that is, supervisory values (FIG. 7C or 7D) of object attributes and supervisory values (FIG. 7E or 7F) of region attributes.

Each of the supervisory values of the object attributes is a value indicating a specific object included in each region block, among a pedestrian, a small-size face, and a large-size face. More specifically, the supervisory values are obtained by setting, as a positive instance (1), a region block including the reference point of an object, setting the remaining blocks as negative instances (0), and then manually adding values of 0 and 1 for each object category (in this embodiment, setting the centroid of an object region as the reference point of an object).

For each of the categories of the sky, ground, building, and main subject, the supervisory values of the region attribute are obtained by setting, as a positive instance (1), a region block in which an area of a predetermined value or more is in the category, setting the remaining regions as negative instances (0), and then adding values of 0 and 1 for each region category. FIGS. 7E and 7F show detailed examples. The region blocks of positive instances of the sky region, ground region, building region, and main subject region are added with symbols S, G, B, and M, respectively. Note that for the sake of convenience, only the symbol of one region category is described in each region block. However, a plurality of attributes may accompany one region block when, for example, a building is a main subject.

The value of 0 or 1 of the given supervisory value of each attribute is set as a target variable, and the connected layer feature amount $F(x, y)$ of the corresponding region block is set as an explanatory variable, thereby learning the SVM based on many learning instances so as to discriminate between a positive instance and a negative instance. Learning is performed for each attribute j, and the parameters ($[v_{jk}, \alpha_{jk}, b_j]$) of the SVM are obtained for each attribute. The learning procedure of the attribute determination unit 205 has been explained above.

A detailed procedure (details of the processes in steps S5 to S8 above) of outputting the result of a target recognition task by integrating the attribute score maps will be described next. Integration of the attribute score maps is processing of determining the target recognition task using a plurality of attributes as direct/indirect clues. Integration is performed by a rule-based method, a machine learning method using a discriminator or regressor, or a combination thereof. The rule-based method will be described.

In the case of a human body detection task, the attribute of a human body, the attribute of a face, the attribute of a building (which tends to be erroneously detected as a human body), and the like are attributes used as clues for determination of a human body. Since a face and a human body have a co-occurrence relation, and a human body and a building have an exclusive relation in which they do not exist at the same position, integration may be performed in consideration the relations between the attributes. More specifically, integration is performed in a procedure to be described below.

Figure 8A:
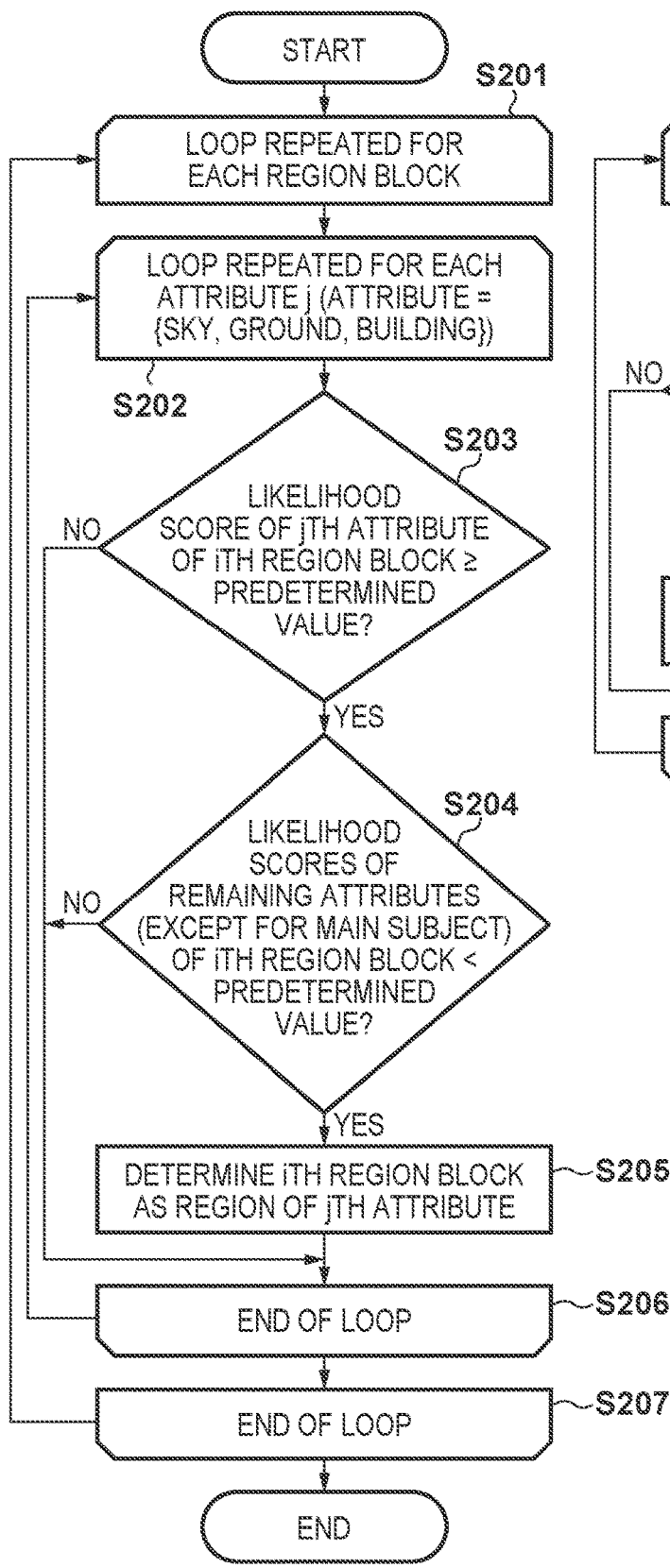
FIGS. 8A and 8B are flowcharts each illustrating an attribute integration procedure related to region determination.
Figure 8B:
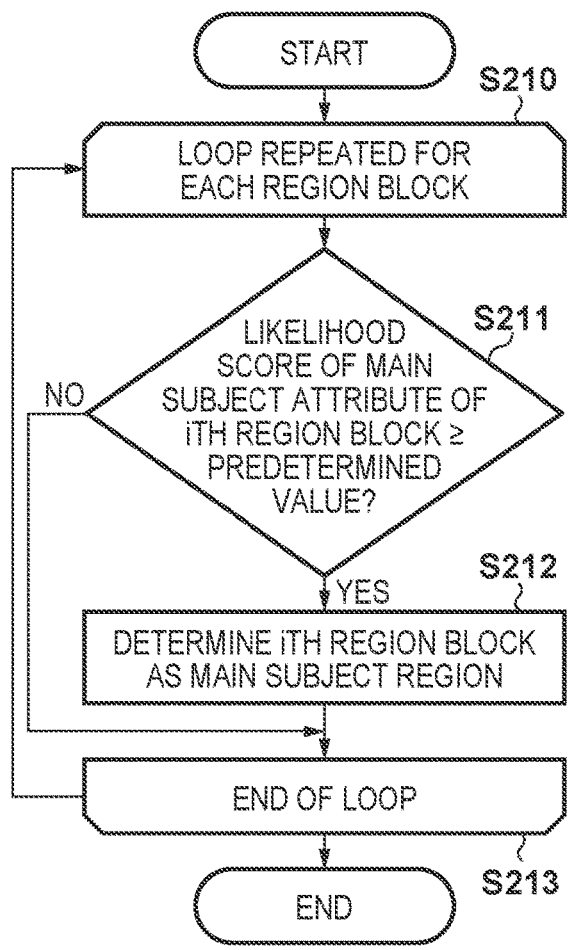

A detailed procedure of outputting the result of the target recognition task by integrating the attribute score maps will be described with reference to FIGS. 8A, 8B, 9A, and 9B. FIGS. 8A and 8B are flowcharts each illustrating an attribute integration procedure related to region determination. FIGS. 9A and 9B are flowcharts each illustrating an attribute integration procedure related to object detection.

FIG. 8A is a flowchart illustrating an integration procedure related to a sky region, a ground region, and a building region. Processes in steps S201 to S207 are performed for each region block in the connected layer feature. The processes in steps S202 to S206 are performed for each attribute (in this embodiment, each of "sky", "ground", and "building").

In step S203, the attribute integration unit 106 determines whether the likelihood score of the jth attribute of the ith ($1 \le i \le I$: I represents the number of region blocks) region block is equal to or larger than a predetermined value. Assume that the first attribute (j=1) is "sky", the second attribute (j=2) is "ground", and the third attribute (j=3) is "building". If, as a result of the determination processing, the likelihood score of the jth attribute of the ith region block is equal to or larger than the predetermined value, the process advances to step S204; otherwise, the process advances to step S206. If the processes in steps S202 to S206 are performed for j=1 to 3, the processes in step S203 and the subsequent steps are performed for the (i+1)th region block. If the processes in step S201 to S207 are performed for i=1 to I, the processing shown in FIG. 8A is complete.

In step S204, the attribute integration unit 106 determines whether the likelihood scores of the remaining attributes (except for the main subject) of the ith region block are smaller than the predetermined value. If, as a result of the determination processing, the likelihood scores of the remaining attributes (except for the main subject) of the ith region block are smaller than the predetermined value, the process advances to step S205; otherwise, the process advances to step S206.

In step S205, the attribute integration unit 106 determines that the attribute of the ith region block is the jth attribute.

FIG. 8B is a flowchart illustrating an integration procedure related to the main subject region. Processing contents are almost the same as those according to the flowchart of FIG. 8A. However, since any of a face, pedestrian, sky, ground, and building can be a main subject, the likelihood scores of the remaining attributes are irrelevant, unlike the procedure shown in FIG. 8A. Processes in steps S210 to S213 are performed for each region block in the connected layer feature.

In step S211, the attribute integration unit 106 determines whether the likelihood score of the attribute "main subject" of the ith ($1 \le i \le I$: I represents the number of region blocks) region block is equal to or larger than a predetermined value. If, as a result of the determination processing, the likelihood score of the attribute "main subject" of the ith region block is equal to or larger than the predetermined value, the process advances to step S212; otherwise, the process advances to step S213, and subsequent processing is performed for the next region block. In step S212, the attribute integration unit 106 determines that the attribute of the ith region block is "main subject".

FIGS. 9A and 9B are flowcharts each illustrating integration procedure for detecting a pedestrian and face. In step S301, the attribute integration unit 106 initializes, to 0, the value of a variable n indicating the number of times of detection of an object. Processes in steps S302 to S310 are performed for each region block in the connected layer feature. The processes in steps S303 to S309 are performed for each attribute (in this embodiment, each of "pedestrian", "small face", and "large face").

In step S304, the attribute integration unit 106 determines whether the likelihood score of the jth attribute of the ith (1≤i≤I: I represents the number of region blocks) region block is equal to or larger than a predetermined value. Assume that the first attribute (j=1) is "pedestrian", the second attribute (j=2) is "small face", and the third attribute (j=3) is "large face". If, as a result of the determination processing, the likelihood score of the jth attribute of the ith region block is equal to or larger than the predetermined value, the process advances to step S305; otherwise, the process advances to step S309. If the processes in steps S303 to S309 are performed for j=1 to 3, the processes in step S304 and the subsequent steps are performed for the (i+1)th region block. If the processes in step S302 to S310 are performed for i=1 to I, the processing shown in FIG. 9A is complete.

In step S305, the attribute integration unit 106 determines whether the likelihood score of the jth attribute of the ith region block is a largest one of the likelihood scores of all the attributes (except for the main subject) of nine region blocks including the current region block and eight region blocks adjacent to it. If, as a result of the determination processing, the likelihood score of the jth attribute of the ith region block is a largest one of the likelihood scores of all the attributes (except for the main subject) of the nine region blocks, the process advances to step S306; otherwise, the process advances to step S309.

In step S306, the attribute integration unit 106 determines that the reference point (the centroid of an object) of an object of the jth attribute has been detected, and increments the value of the variable n by one. In step S307, the attribute integration unit 106 stores, in a memory (not shown) in the image processing apparatus, the position of the reference point of the object and the likelihood score of the jth attribute of the ith region block in association with each other.

In step S308, the attribute integration unit 106 performs position correction by sub-pixel estimation to estimate the position of the object more finely. Sub-pixel estimation is performed using a method described in Emmanouil Z. Psarakis and Georgios D. Evangelidis, An Enhanced Correlation-Based Method for Stereo Correspondence with Sub-Pixel Accuracy, ICCV 2005. In Emmanouil Z. Psarakis and Georgios D. Evangelidis, An Enhanced Correlation-Based Method for Stereo Correspondence with Sub-Pixel Accuracy, ICCV 2005, position correction is performed based on the values of the scores around the position of the object.

The process advances to step S311 of FIG. 9B. Processes in steps S311 to S315 are performed for each of the objects detected by the processing according to the flowchart of FIG. 9A.

In step S312, the attribute integration unit 106 selects, as a selected object, an unselected one (kth object (k=1 to n)) of the objects detected by the processing according to the flowchart of FIG. 9A. The attribute integration unit 106 determines whether the attribute of the selected object is "small face" or "large face". If, as a result of the determination processing, the attribute of the selected object is "small face" or "large face", the process advances to step S313; otherwise, the process advances to step S314.

In step S313, using the likelihood scores of the two kinds of faces with different sizes, the attribute integration unit 106 estimates the size of a face by the weighted sum given by:

$$\text{estimated face size} = \Sigma_{i \in \{small, large\}} L_i \times \text{reference size}_i / \Sigma_{i \in \{small, large\}} L_i$$

Note that $L_{small}$ and $L_{large}$ respectively represent the likelihood scores of the small- and large-size faces, and reference size$_{small}$ and reference size$_{large}$ respectively represent predetermined reference values concerning the face size.

In the above processes up to step S315, pieces of attribute information randomly existing in the region blocks, such as the likelihoods of each of the categories of the faces for respective sizes, the pedestrian, and the background regions, are organized, and integrated as an object detection result whose position and size are identified. Note that in this embodiment, integration is individually performed for each of the pedestrian and faces. However, for example, a co-occurrence relation in which a small-size face highly likely exists around a region block hiving a high likelihood of the pedestrian can be used. For example, the following method is plausible as a derivative form. (1) The score map of the pedestrian is blurred and added to the score map of the small-size face. (2) The thus obtained map is set as a new score map of the small-size face. (3) The attribute integration processing (steps S301 to S315) is performed in the same procedure as that described above.

For example, the following method is plausible as an attribute integration form capable of preventing a building from being erroneously detected as a pedestrian. (1) The score map of the building region is subtracted from that of the pedestrian. (2) The thus obtained map is newly set as a score map of the pedestrian. (3) The attribute integration processing (steps S301 to S315) is performed in the same procedure as that described above.

FIG. 6B shows an integration result 606 as an example of a result obtained by the processing of the attribute integration unit 106 above. Pedestrian and face detection results are indicated by broken-line frames, and the region blocks determined as sky, ground, building, and main subject regions are added with the symbols S, G, B, and M, respectively.

In step S314, the result output unit 107 outputs "a rectangular frame with an estimated size" for the position of the detected face. If a pedestrian is detected, the result output unit 107 outputs "a rectangular frame with a predetermined size" for the position of the pedestrian. Similarly, in step S316, the result output unit 107 outputs labels for the region blocks of the sky, ground, and building regions. In step S317, the result output unit 107 outputs labels for the region blocks of the main subject region. These output data are obtained as a final output result. FIG. 6B shows a final output result 607 as an example of the final output result obtained by the result output unit 107.

Note that by adopting the attribute information integration method described in this embodiment like correction of the position of the object or estimation of the size of the face, the final output result 607 is obtained at a resolution higher than those of the original attribute score maps. To generate a detailed connected layer feature or detailed attribute score map, high calculation cost is required. On the other hand, with the attribute integration method described in this embodiment, it is possible to obtain, at relatively low calculation cost, a detailed result from the attribute score maps with low resolutions. This point is particularly emphasized since this is one of features of this embodiment in which the plurality of attributes are determined and integrated to recognize a target.

Modification of First Embodiment

Although the CNN is used as a neural network in the first embodiment, a usable neural network is not limited to this. Any neural network that is formed from a plurality of layers and generates an intermediate result as a map and any method of this type are applicable. An example of this method is non-CNN type neural network that performs no weight sharing for the convolution filter of each layer.

As another example, a form that adopts the same convolution processing as in the CNN may be used as the attribute determination unit 205 instead of the SVM. In this derivative form, it is possible to learn the parameters of the convolution processing of the attribute determination unit 205 and the parameters of the neural network 102 of the preceding stage at the same time by a back propagation method. In this case, it can be expected to improve the accuracy of the recognition task (which is called end-to-end learning, and widely known by Shaoqing Ren, Kaiming He, Ross Girshick, Jian Sun, Faster R-CNN: Towards Real-Time Object Detection with Region Proposal Networks, NIPS 2015, and the like, and a detailed description thereof will be omitted), as compared to a case in which learning is performed individually.

In the first embodiment, the up-sampling processing is performed for the feature map when generating a connected layer feature. As a derivative form, a method called deconvolution disclosed in Hyeonwoo Noh, Seunghoon Hong, Bohyung Han, Learning Deconvolution Network for Semantic Segmentation, ICCV 2015 may be used. FIG. 10 shows an example of the form. With the processes of deconvolution filters 407a and 407b, feature maps having resolutions twice and four times those of feature maps 403b and 403c are generated from the feature maps 403b and 403c, respectively. The deconvolution filters 407a and 407b can also be learned integrally with the attribute determination unit 205 and the neural network 102 by the back propagation method. In this derivative form, it can be expected to improve the accuracy of the recognition task, as compared to a case in which simple up-sampling is used. As another form, the same convolution processing as in the CNN may be adopted for the attribute integration unit 106, instead of the rule-based method. As described above, various derivative forms are plausible for each module, and the present invention is not limited to a specific form.

Second Embodiment

In the following embodiments and modifications including this embodiment, the difference from the first embodiment will mainly be described. The remaining parts are the same as in the first embodiment, unless otherwise specified. In this embodiment, a form in which recognition processing that is robust against a variation in orientation of an object such as a person is performed will be described.

In the convolution method described in Shaoqing Ren, Kaiming He, Ross Girshick, Jian Sun, Faster R-CNN: Towards Real-Time Object Detection with Region Proposal Networks, NIPS 2015, an object candidate region (to be referred to as a region of interest hereinafter) may be set to improve the detection accuracy with respect to objects of various sizes and orientations. However, in the conventional method, a plurality of regions of interest are set on an image and the feature amounts of a neural network are totaled for each region of interest, resulting in high calculation cost. To cope with a variation in orientation of an object, many regions of interest are often set by variously changing the size and aspect ratio. This embodiment will explain one form in which an object is detected robustly against variations in size and orientation by a method different from the above-described one without performing processing requiring high calculation cost.

Figure 11:
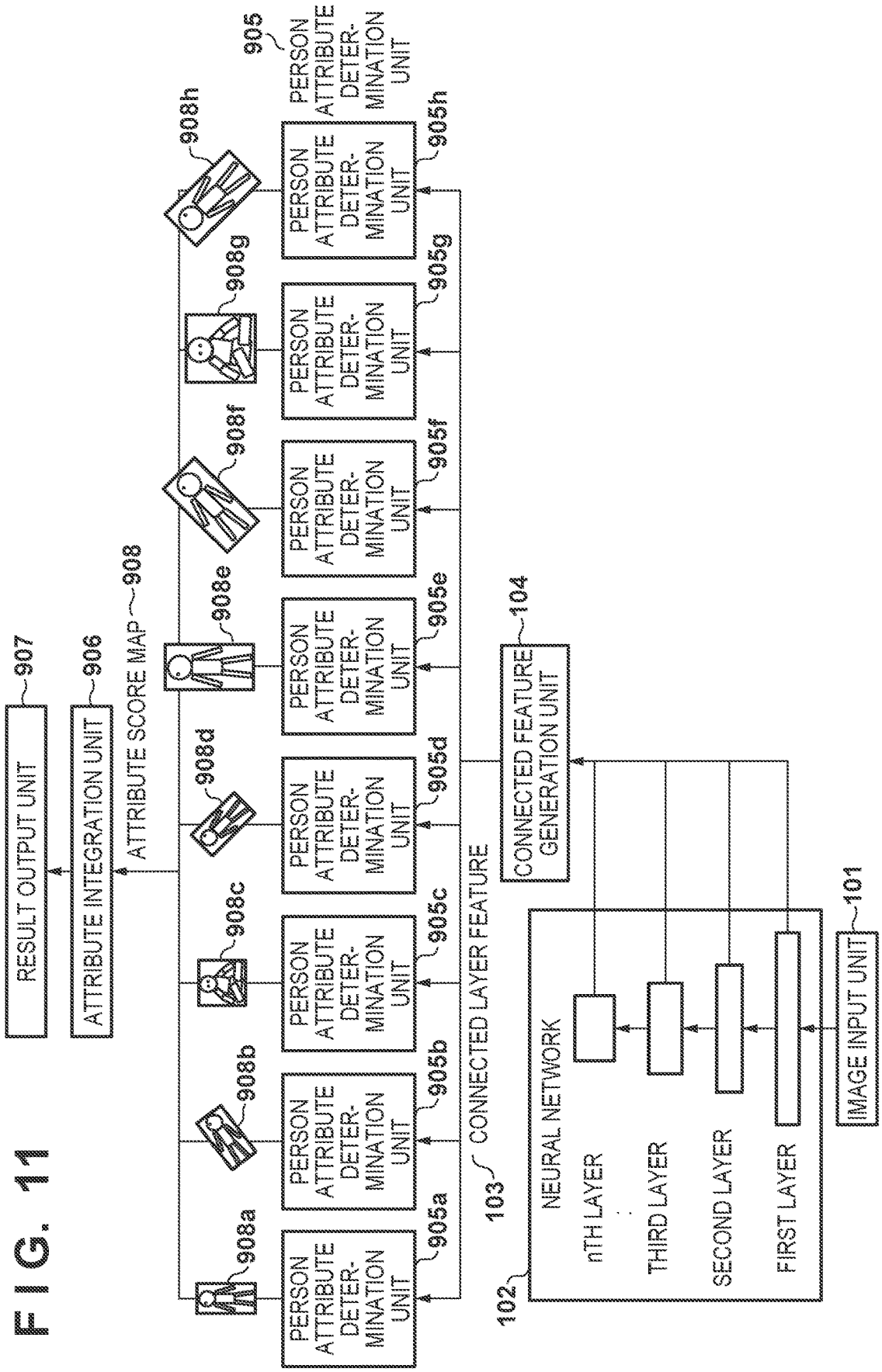
FIG. 11 is a block diagram showing an example of the functional arrangement of an image processing apparatus.

An example of the functional arrangement of an image processing apparatus according to this embodiment will be described with reference to the block diagram of FIG. 11. In FIG. 11, the same reference numerals as in FIG. 1 denote the same functional units and a description thereof will be omitted. The image processing apparatus shown in FIG. 11 is specialized for detection of a person. As denoted by reference numerals 908a to 908h in FIG. 11, persons are classified into eight appearance pattern groups in accordance with the sizes, gradients, and aspect ratios of frames of person regions. More specifically, in FIG. 11, the eight groups are defined by combinations of parameters, as follows.

Group 1: size small, gradient 0°, aspect ratio 2
Group 2: size small, gradient +45°, aspect ratio 2
Group 3: size small, gradient 0°, aspect ratio 1
Group 4: size small, gradient −45°, aspect ratio 2
Group 5: size large, gradient 0°, aspect ratio 2
Group 6: size large, gradient +45°, aspect ratio 2
Group 7: size large, gradient 0°, aspect ratio 1
Group 8: size large, gradient −45°, aspect ratio 2

In this embodiment, the above eight groups correspond to eight attributes (person attributes) of persons. A person attribute determination unit 905 determines a type of a person, among the eight types, included in each region or whether no person exists in each region. Each of person attribute determination units 905a to 905h learns in advance so as to determine a person of a corresponding group when it is input. A learning procedure is performed, as follows.

(1) A training image is prepared, and a frame of a detection region is given in advance to each person in the image. The frame has three parameters of a position, size, and gradient. (2) Instances of persons are classified into the eight groups in accordance with the sizes and gradients of the detection region frames (the instances may be clustered by a non-supervisory method or manually divided into the groups). (3) Each of eight attribute determiners is provided with person data of a corresponding group as a positive instance and data of regions except for a person as negative instances to learn a discriminator using a connected layer feature as an explanatory variable.

Figure 12A:
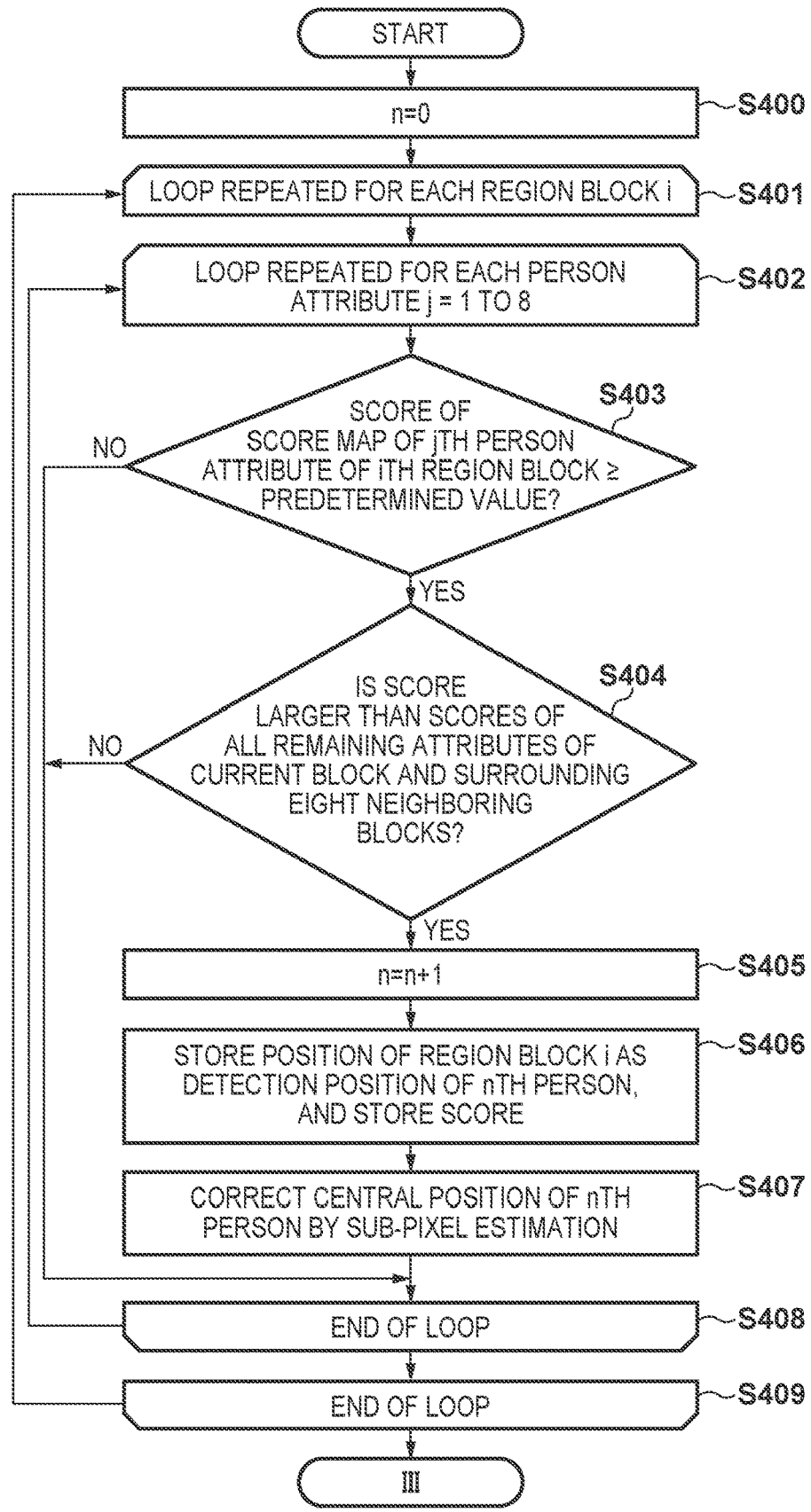
FIGS. 12A and 12B are flowcharts each illustrating an integration procedure for person detection.
Figure 12B:
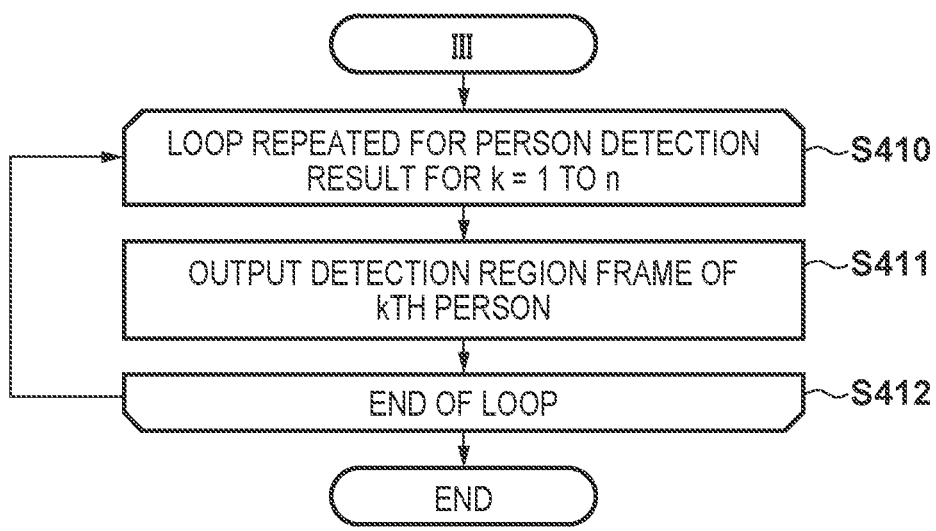

FIGS. 12A and 12B are flowcharts each illustrating an integration procedure for person detection. The flowcharts of FIGS. 12A and 12B are obtained by setting a person as a detection target in the flowcharts of FIGS. 9A and 9B, and replacing the jth attribute by the jth person attribute. Processing is the same as that according to the flowcharts of FIGS. 9A and 9B. That is, processes in steps S400 to S409 are the same as those in steps S301 to S310 of FIG. 9A except for the above points. In addition, processes in steps S410 to S412 are the same as those in steps S311, S314, and S315 of FIG. 9B. Therefore, a description of each step of the flowcharts of FIGS. 12A and 12B will be omitted.

FIG. 13 shows an attribute determination example and a result output example according to this embodiment. In this example, with respect to an input image 1201, an attribute determination result 1202 of detection region frames of a plurality of sizes, gradients, and aspect ratios (the magnitude of each likelihood score is expressed by the color density of the frame) is obtained. An attribute integration unit 906 integrates the result data, and outputs an output result 1203 obtained by superimposing, on the input image 1201, candidate frames (frames 1203*a* and 1203*b*) of largest likelihoods for the region blocks. As a result, as shown in FIG. 13, detection region frames of gradients and sizes appropriate for the orientations of the persons are output.

Note that no feature totalization is performed for each detection region frame of an object (every time), unlike Shaoqing Ren, Kaiming He, Ross Girshick, Jian Sun, Faster R-CNN: Towards Real-Time Object Detection with Region Proposal Networks, NIPS 2015, and the like. Instances are divided into the eight groups in accordance with the appearances of patterns. Note that this easily solves an attribute determination problem, and allows a light linear discriminator to determine a pattern.

Note that in this embodiment, only frames of largest likelihoods are left at the time of integration of detection frames. However, as a derivative form, the weighted sum may be used to estimate the detailed size of a person, as in the first embodiment. In addition, detailed values of an aspect ratio and gradient may be estimated. These values are given by:

estimated size=$\Sigma_i L_i$×parameter of size of ith attribute/$\Sigma_i L_i$ estimated aspect ratio=Exp{$\Sigma_i L_i$×Log(parameter of aspect ratio of ith attribute)/$\Sigma_i L_i$} estimated gradient value=$\Sigma_i L_i$×parameter of gradient of ith attribute/$\Sigma_i L_i$ where $L_i$ represents the likelihood score of the ith attribute. The aspect ratio indicates a value obtained by dividing the vertical size of the frame by the horizontal size. As another derivative form, instead of the eight person attributes, nine kinds of attribute determination processes may be performed by dividing each parameter into three groups, that is, size={large, medium, small}, gradient={right, middle, left}, and aspect ratio={vertically long, square, horizontally long}.

As still another derivative form, a contrivance of performing two-stage attribute determination processing to reduce the calculation amount is plausible. For example, an example of a procedure at the time of recognition is as follows.

(1) As the first attribute determination, three kinds of person sizes={large, medium, small} are determined.

(2) The second attribute determination is performed by classifying, into one of eight kinds, only a region block having a high likelihood score for one of the three kinds in (1) in accordance with the size, gradient, and aspect ratio.

As still another derivative form, the values of the size, gradient, and aspect ratio are individually estimated by a regressor without performing grouping. In addition to the above-described forms, various forms are applicable in terms of the determination target attribute, the attribute determination order, and the integration order, and the present invention is not limited to a specific form.

Third Embodiment

This embodiment shows a form in which camera information is mainly used, and a recognition task according to this embodiment aims at determination of a sky region. An example of the functional arrangement of an image processing apparatus according to this embodiment will be described with reference to the block diagram of FIG. 14.

The image processing apparatus according to this embodiment has a feature in which a camera information input unit 1308 is included. As another feature, an attribute determination unit 1305 includes likelihood determination units 1305*a* and 1305*b* for regions of detailed subcategories concerning the sky, that is, a blue sky region and a cloud region. As still another feature, the attribute determination unit 1305 includes likelihood determination units 1305*c* and 1305*d* for categories that tend to be erroneously determined as the sky, such as a water surface and a white wall.

The attribute determination unit 1305 can include not only attributes (blue sky and cloud) as direct recognition targets but also attributes (water surface and white wall) as indirect targets used as clues for the recognition task. Thus, a pattern is comprehensively determined, and it can be expected to improve the accuracy of the recognition task.

Figure 15A:
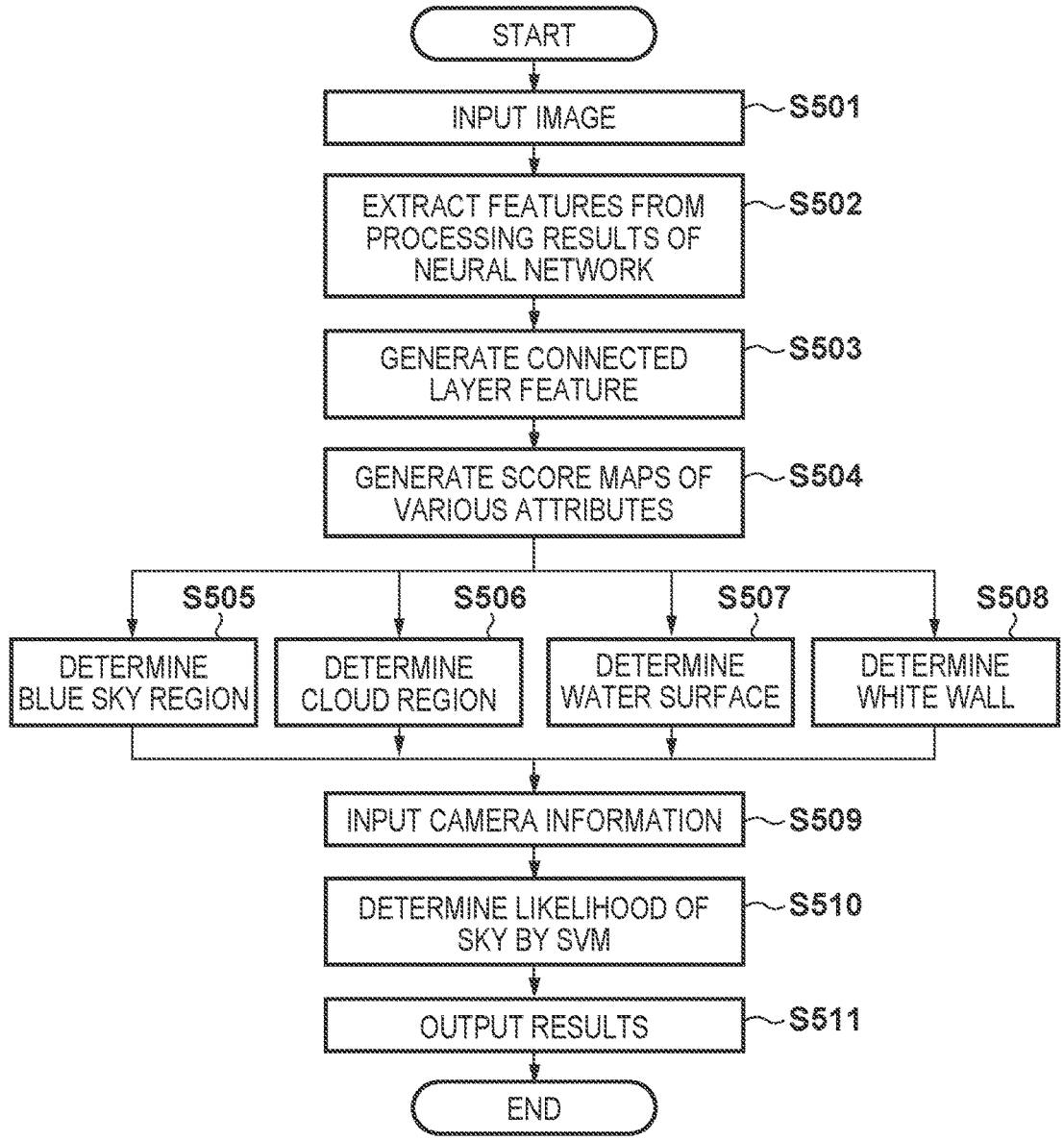
FIGS. 15A and 15B are flowcharts illustrating the operation of the image processing apparatus.
Figure 15B:
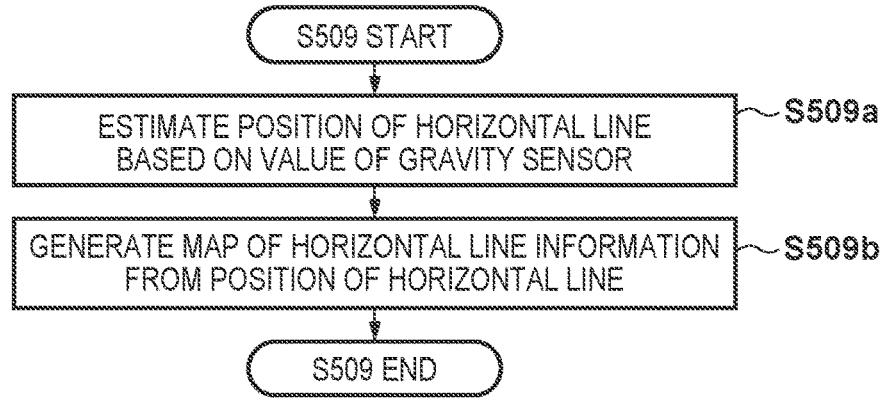

The operation of the image processing apparatus according to this embodiment will be described with reference to the flowcharts of FIGS. 15A and 15B. Processes in steps S501 to S504 are the same as those in steps S1 to S4 of FIG. 3, and a description thereof will be omitted. Processes in steps S505 to S508 are processes for processing of determining the likelihood of each attribute for each region block, and are as described in the first embodiment, and a description thereof will be omitted.

In step S509, the camera information input unit 1308 inputs, as camera information, a horizontal line information value at the time of image capturing. More specifically, the horizontal line information value is as shown in FIG. 16A. The camera information input unit 1308 includes a gravity sensor, and estimates a position 1501 of a horizontal line on an image in step S509*a*. In step S509*b*, the camera information input unit 1308 generates a horizontal line information value 1502 indicating a value representing the number of blocks by which each region block exists above or below the estimated position 1501 of the horizontal line.

In step S510, based on the horizontal line information value 1502 and the four attribute scores of the blue sky, cloud, water surface, and white wall, an SVM 1306 finally determines whether each region block is the sky. In this example, using, as five-dimensional input feature amount, the five kinds of maps (attribute score maps 1318 obtained by the likelihood determination units 1305*a* to 1305*d*, and a map of the horizontal line information values 1502), the SVM 1306 calculates the likelihood of the sky for each region block. By using the camera information concerning the horizontal line together, for example, it is possible to suppress the water surface reflecting the sky from being erroneously determined as the sky in the lower portion of the image.

Note that in order to determine the likelihood of the sky, parameters of the SVM are learned in advance by providing a plurality of training image data 1309, pieces of camera information 1310 corresponding to the training image data 1309, and a supervisory value 1311 of the category of each region block as a supervisory value indicating whether the region block is the sky.

As another derivative form using the camera information, as shown in FIG. 16B, in-focus information values 1504 of a camera are used. This is a map obtained by setting 0 for a focal plane (indicated by a symbol x in FIG. 16B) that is in focus in the image, and quantifying a position of a subject in each region block backward or forward from the focal plane. The in-focus information of the camera is generated by an optical mechanism called an image plane phase difference AF additionally included in the camera information input unit 1308. By using the in-focus information values 1504 together, for example, it is possible to suppress a white artifact blurred away backward from the focal plane from being erroneously determined as the sky.

As still another derivative form using the camera information, as shown in FIG. 16C, a method of using photometry information values 1505 of the camera is plausible. Each of these values is a numerical value representing the physical light amount of an image, and can be obtained from the result of the photometry sensor of the camera additionally included in the camera information input unit 1308. As one form, the photometry information values are called By values, and known by Japanese Patent Application No. 2015-115171, and a detailed description thereof will be omitted. By using the photometry information values together, it is possible to suppress erroneous discrimination between a white wall and a cloudy sky, as compared to a case in which only an RGB image is used.

Figure 14:
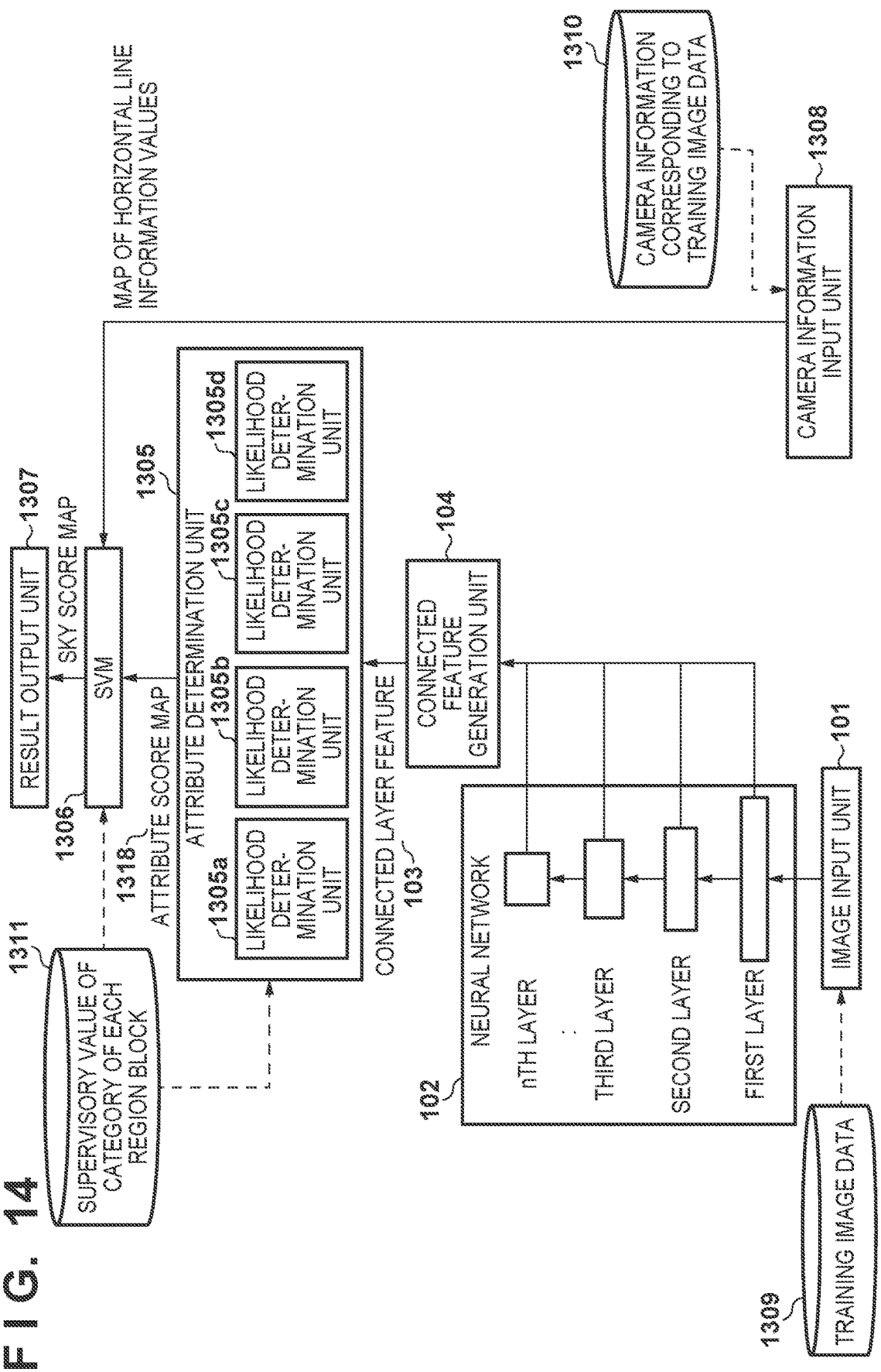
FIG. 14 is a block diagram showing an example of the functional arrangement of an image processing apparatus.
Figure 17:
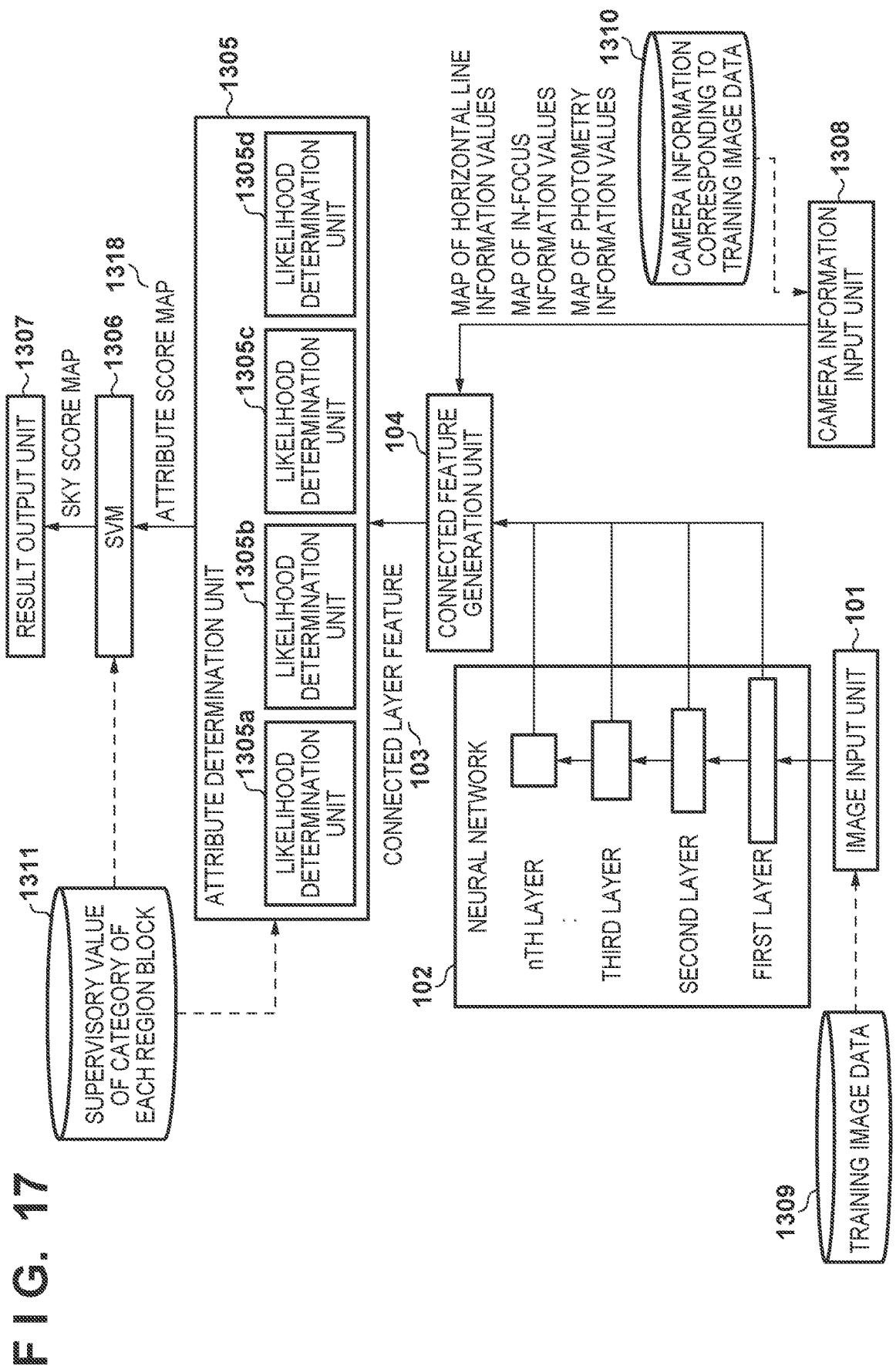
FIG. 17 is a block diagram showing another example of the functional arrangement of the image processing apparatus.

As still another derivative form, the maps of the pieces of camera information may be connected and used when generating a connected layer feature 103. FIG. 17 shows an example of the functional arrangement of an image processing apparatus in this case. As shown in FIG. 17, the "map of horizontal line information values", "map of in-focus information values", and "map of photometry information values" as three kinds of camera information (three dimensions) are connected at the time of generating a connected layer feature, and sent to the likelihood determination units 1305a to 1305d. Each of the discriminators of the likelihood determination units 1305a to 1305d determines the corresponding attribute using the feature amount of the connected layer feature and the three-dimensional camera information as a feature amount. Assume that each of the likelihood determination units 1305a to 1305d has learned in advance parameters of the discriminator so as to determine the likelihood of each attribute using the plurality of training image data 1309, the pieces of camera information 1310 corresponding to the training image data, and the supervisory value 1311 of the category of each region block. Note that which of the form of using the camera information at the time of attribute integration as shown in FIG. 14 and the form of using the camera information at the time of attribute determination as shown in FIG. 17 is more desirable depends on the amount and quality of learning data.

This embodiment has described the additional use forms of the camera information. This embodiment has also described the effect in using the detailed subcategories and indirect attributes as attribute determination targets. The use of the subcategories and indirect attributes is applicable to another recognition task. For example, there may be provided a form of performing attribute determination by classifying a target into a subcategory in accordance with a sex or an appearance (the presence/absence of a hat or glasses or the like) at the time of person detection. In addition, in a person detection task, there may be a form of providing dog attribute determination to prevent erroneous discrimination.

Note that each subcategory is classified by at least one of the depth rotation of an object, the in-plane rotation of the object, the orientation of the object, the shape of the object, the material of the object, the shape of a region of interest of the object, the size of the region of interest of the object, and the aspect ratio of the region of interest of the object.

Fourth Embodiment

In this embodiment, a form of processing many kinds of recognition tasks comprehensively will be described. Recognition tasks performed by an image processing apparatus according to this embodiment include three kinds of tasks, that is, a region determination task, image scene classification task, and aesthetic property determination task.

Figure 18:
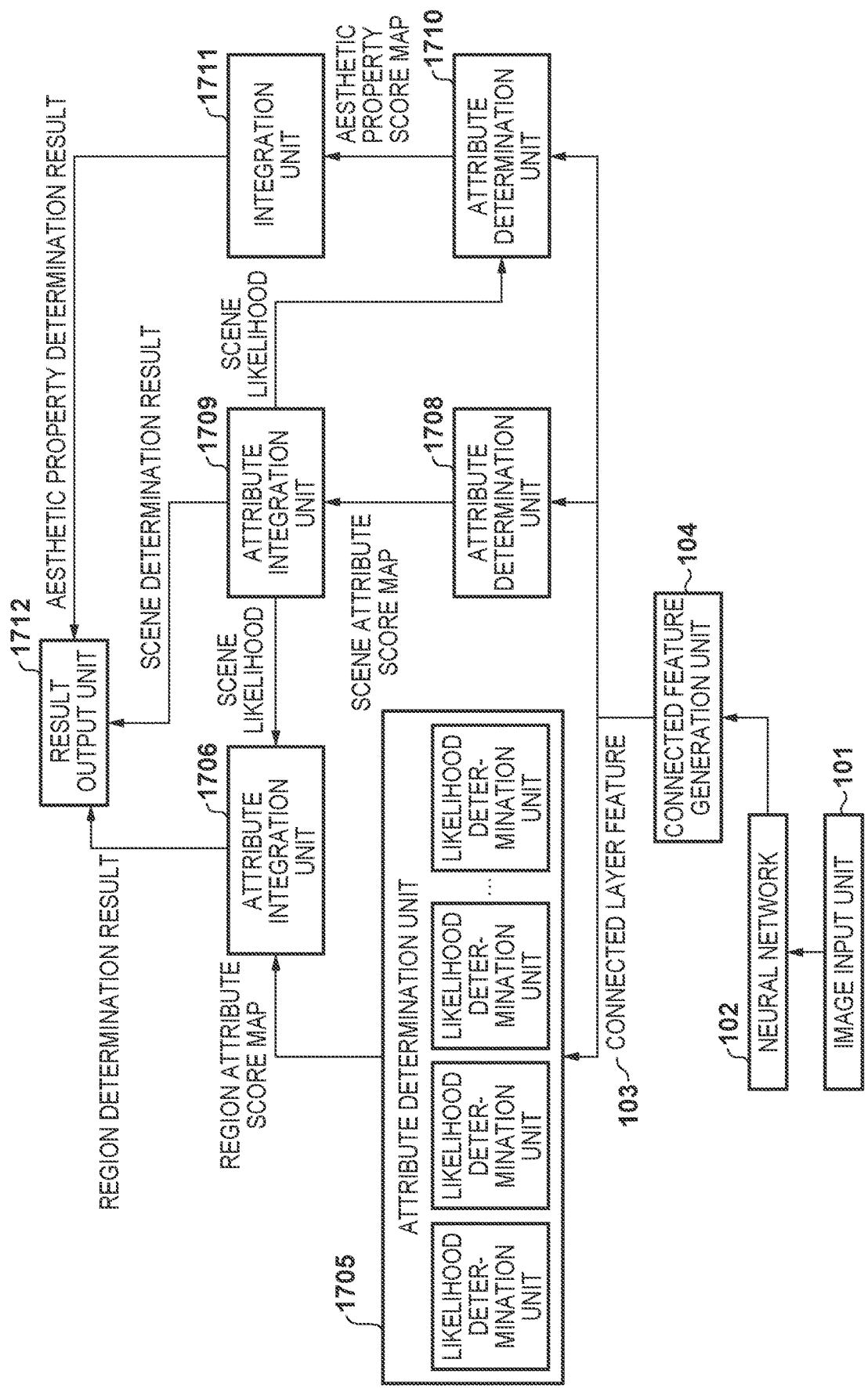
FIG. 18 is a block diagram showing an example of the functional arrangement of an image processing apparatus.
Figure 19:
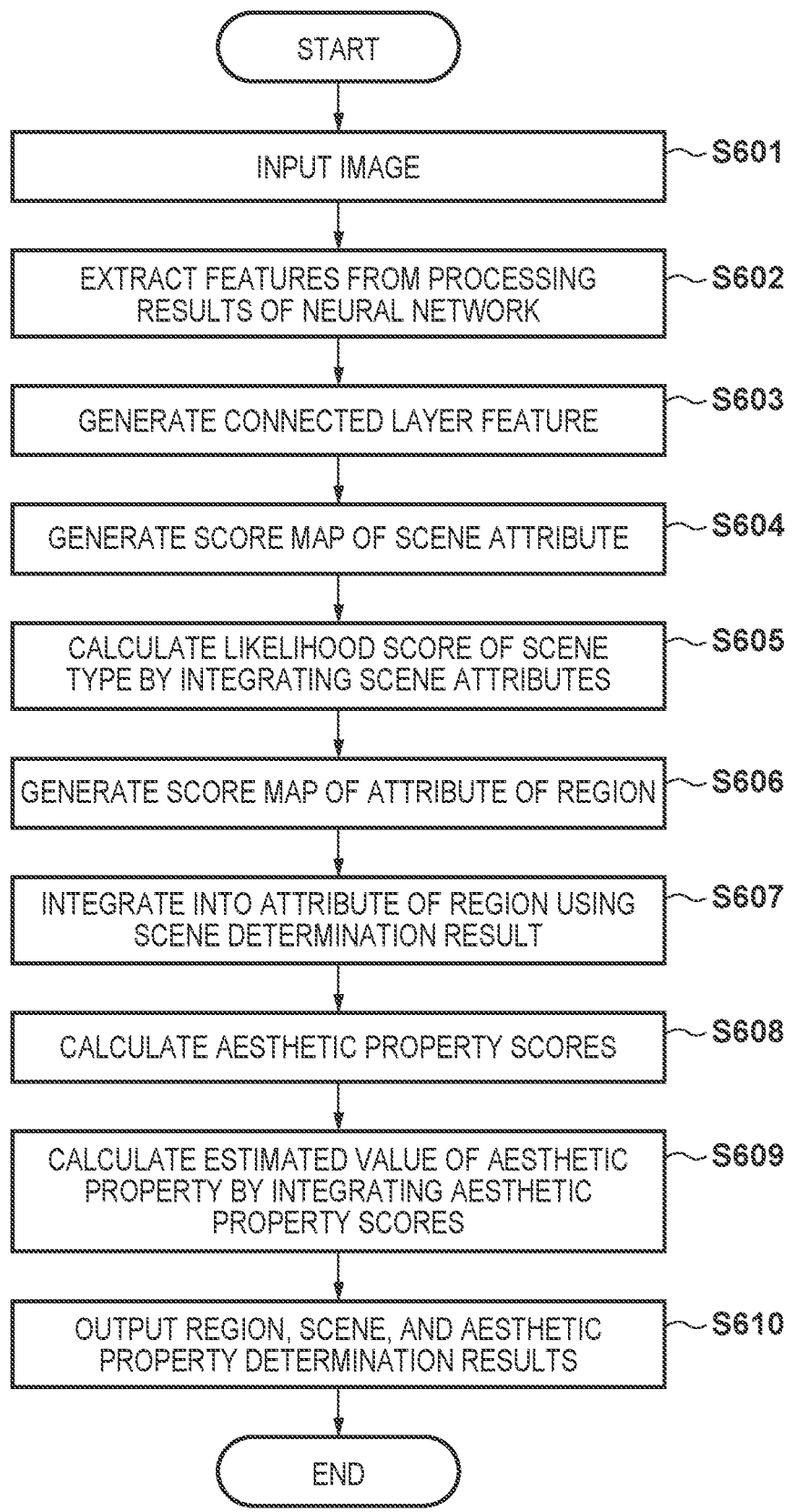
FIG. 19 is a flowchart illustrating the operation of the image processing apparatus.

FIG. 18 shows an example of the functional arrangement of the image processing apparatus according to this embodiment. The operation of the image processing apparatus according to this embodiment will be described with reference to the flowchart of FIG. 19. Steps S601 to S603 correspond to processing of generating a connected layer feature by performing the same processing as in the above embodiments. Step S604 corresponds to processing in which an attribute determination unit 1708 determines a scene attribute for each region block (x, y). N scene classifications such as an indoor scene, person portrait scene, and sport scene are assumed as the scene attribute. The attribute determination unit 1708 uses a connected layer feature F(x, y) as an input feature to determine, for each region block (x, y), one of the N scenes to which the image belongs. A general decision tree is used as a classifier for the determination processing. The layer feature F(x, y) indicates a feature for the region block (x, y), and includes a feature of a high layer in a neural network. Note that the feature of the high layer includes information obtained by aggregating image patterns in a wide range, and thus such image scene classification determination is possible.

In step S605, an attribute integration unit 1709 performs scene determination for the entire image by integrating the results of scene attributes of the region blocks. A linear SVM is used as a discriminator. The likelihood scores of the scene attributes of the region blocks are connected to obtain a feature amount, and the linear SVM performs learning/determination of a scene into which the input image is classified.

Note that the category of a scene at the time of scene attribute determination need not match the category at the time of attribute integration. For example, in scene attribute determination, a detailed classification such as "soccer", "baseball", "mountain", or "beach" may be determined, and an upper classification such as "sport scene" or "natural scene" may be determined at the time of scene attribute integration. As in the above embodiments, the category of the attribute can take various forms as long as they are used as clues for the target recognition task.

In step S606, an attribute determination unit 1705 obtains an attribute score map. This is the same as the method applied for the sky region in the first embodiment or the like and a description thereof will be omitted. In step S607, an attribute integration unit 1706 determines the type of each region block in consideration of the scene likelihood of the image obtained in the preceding stage. More specifically, the following equations are used.

$$P(c|f) = \Sigma_s P(c|s,f)P(s)$$

$$P(c|s,f) = P(c|s)P(c|f)$$

where P(c|f) represents a posteriori probability that the region attribute of a given region block is c, f represents an input feature, P(c|s) represents a prior distribution in which the region attribute c appears in a scene s, and P(s) represents a value obtained by converting, into a probability, the scene likelihood obtained in step S605. This can determine the type of the region in consideration of the prior distribution of the instance, for example, that a sea region hardly appears in an indoor scene.

In step S608, an attribute determination unit 1710 determines the aesthetic property attribute for each region block (x, y). As known by Wei Luo, XiaogangWang, Xiaoou Tang, Content-Based Photo Quality Assessment, ICCV 2011 and the like, learning data in each of which an image is associated with its aesthetic property assessment value are prepared in advance, the connected layer feature F(x, y) is used as an input feature, and a regressor such as logistic regression learns/estimates an aesthetic property score value. At this time, the attribute determination unit 1710 may receive the likelihood of the scene from the attribute integration unit 1709, and changes the weight dictionary of the regressor in accordance with the scene. This is a method known by Wei Luo, XiaogangWang, Xiaoou Tang, Content-Based Photo Quality Assessment, ICCV 2011.

In step S609, an integration unit 1711 obtains the scalar value of the aesthetic property determination result by integrating the attributes of the aesthetic property. In this example, a CNN formed from a plurality of layers is used as the integration unit 1711. The CNN is assumed to be a network that regressively learns a weight parameter so that an aesthetic property score map of the region blocks (x, y) is input and an output layer can correctly output the aesthetic property assessment value of the entire image. A regression learning method using such CNN is known by Shaoqing Ren, Kaiming He, Ross Girshick, Jian Sun, Faster R-CNN: Towards Real-Time Object Detection with Region Proposal Networks, NIPS 2015 and the like, and a detailed description thereof will be omitted. As another form of the integration unit 1711, an ensemble average of the region blocks may be used or a linear discriminator may be used. One of these forms can be selected in accordance with the balance between the calculation amount and the accuracy. Finally, in step S610, a result output unit 1712 outputs a region determination result, a scene determination result, and an aesthetic property determination result, thereby ending the operation.

The method of executing the plurality of recognition tasks integrally has been described above. Processing that is highest in calculation cost in this image processing apparatus is the arithmetic processing of the CNN. In this embodiment, the arithmetic processing of the CNN is performed only once. Instead, a plurality of pieces of attribute information are estimated by light attribute determination processing of the succeeding stage, and integrated by the attribute integration unit by making the pieces of information interact with each other, thereby obtaining an accurate recognition result. This method is one of the features of the image processing apparatus according to this embodiment.

As a derivative form, part or all of the attribute integration unit may be replaced by a module called a fully connected layer of the neural network. In this case, as described in the first embodiment, the parameters of each module can be optimally learned comprehensively by a method such as a back propagation method.

Figure 20:
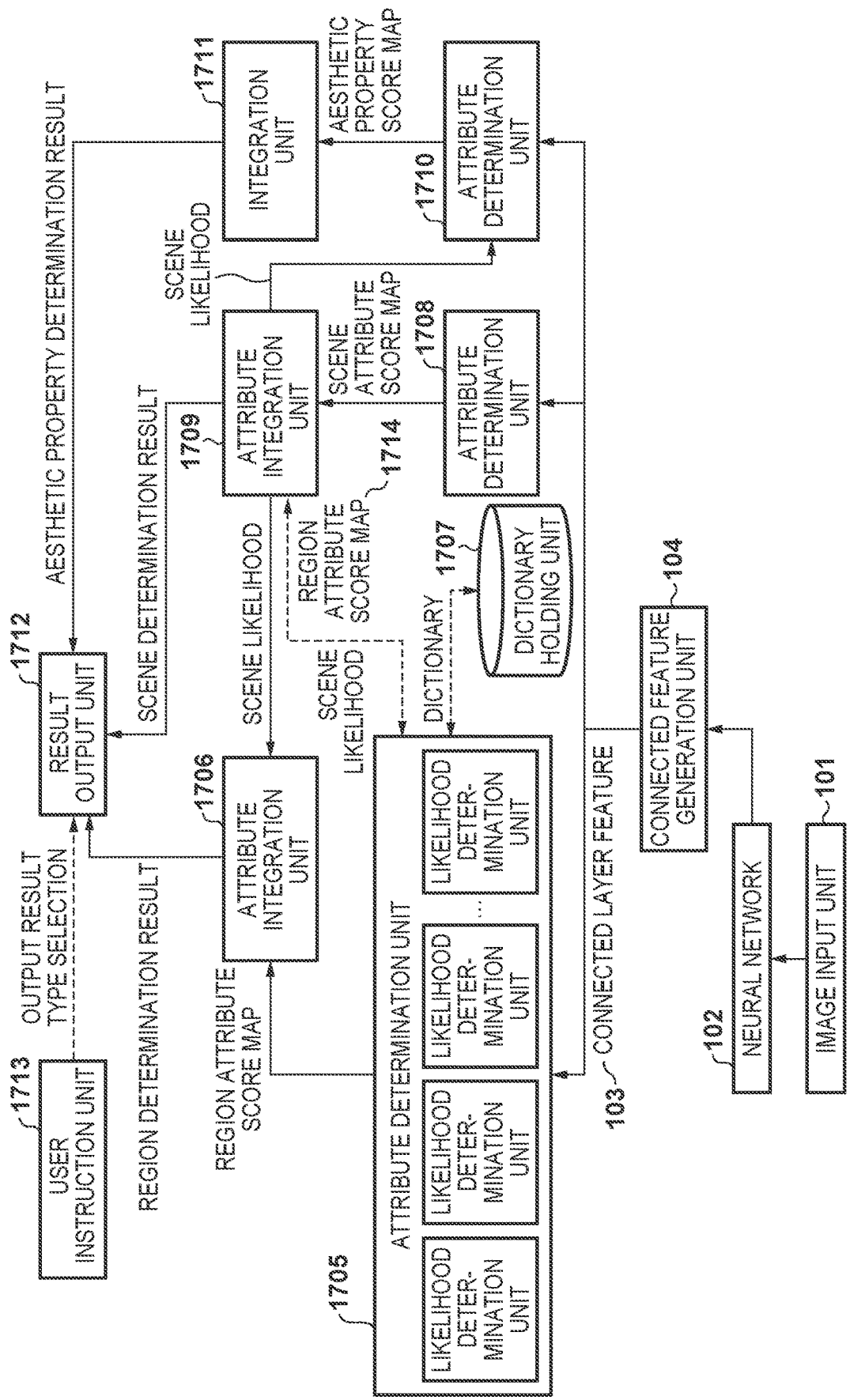
FIG. 20 is a block diagram for explaining a derivative form of the fourth embodiment.

As another derivative form, a form shown in FIG. 20 may be applicable. This derivative form includes a dictionary holding unit 1707 in addition to the arrangement shown in FIG. 18. An attribute integration unit 1709 of this derivative form determines a scene type, and then sends the likelihood of the scene to an attribute determination unit 1705. The attribute determination unit 1705 receives information of the likelihood of the scene, and sets, as an attribute determination target, only a region category having a high appearance frequency in the scene having a high likelihood. The attribute determination unit 1705 performs attribute determination by reading out the dictionary of the attribute determination target from the dictionary holding unit 1707. By performing attribute determination using a scene recognition result by making contrivance, it can be expected to reduce the calculation amount and improve the robustness against noise.

As still another derivative form, there is provided a method of performing scene classification by an image scene classification method based on the connected layer feature, which is represented by the Bag-of-Words method (Lazebnik, Schmid, Ponce, Beyond Bags of Features: Spatial Pyramid Matching for Recognizing Natural Scene Categories, CVPR 2006) without performing attribute determination processing for scene classification.

As still another derivative form, the attribute determination unit 1705 may determine the region attribute such as "person" or "grass", and generate a region attribute score map 1714. The attribute integration unit 1709 may receive this map and use it for scene determination of whether the scene is "sport scene". In this way, an attribute determination result can be used commonly among the recognition tasks, thereby lightening the processing amount of the overall image processing apparatus. As still another form, a user instruction unit 1713 may further be provided, as shown in FIG. 20. The user instruction unit 1713 accepts, from the user, a selection instruction to output a specific one of the results of the plurality of recognition tasks including the region determination task, scene recognition task, and aesthetic property determination task. When multitask recognition is performed, if all the results are always output, it is difficult to view the results. Thus, it is possible to change the output result by the above method in accordance with user's desire or a shooting mode.

Note that some or all of the above-described embodiments and modifications may be used in combination appropriately, or may be selectively used.

As described above, according to each of the above-described embodiments and modifications, the hierarchical feature amount of the neural network and light discriminators are used to determine a plurality of attributes, and the attributes are integrated, thereby executing recognition processing. This can perform high-speed object detection processing robust against the size and orientation without executing conventional processing requiring high calculation cost. In another form, it is possible to perform detection of an object, determination of the category of each region, classification of the category of an image scene, determination of the aesthetic property of image information, and the like at the same time. In still another form, it is possible to detect, at high speed, objects having various appearances different in size, aspect ratio, and gradient.

Fifth Embodiment

Figure 21:
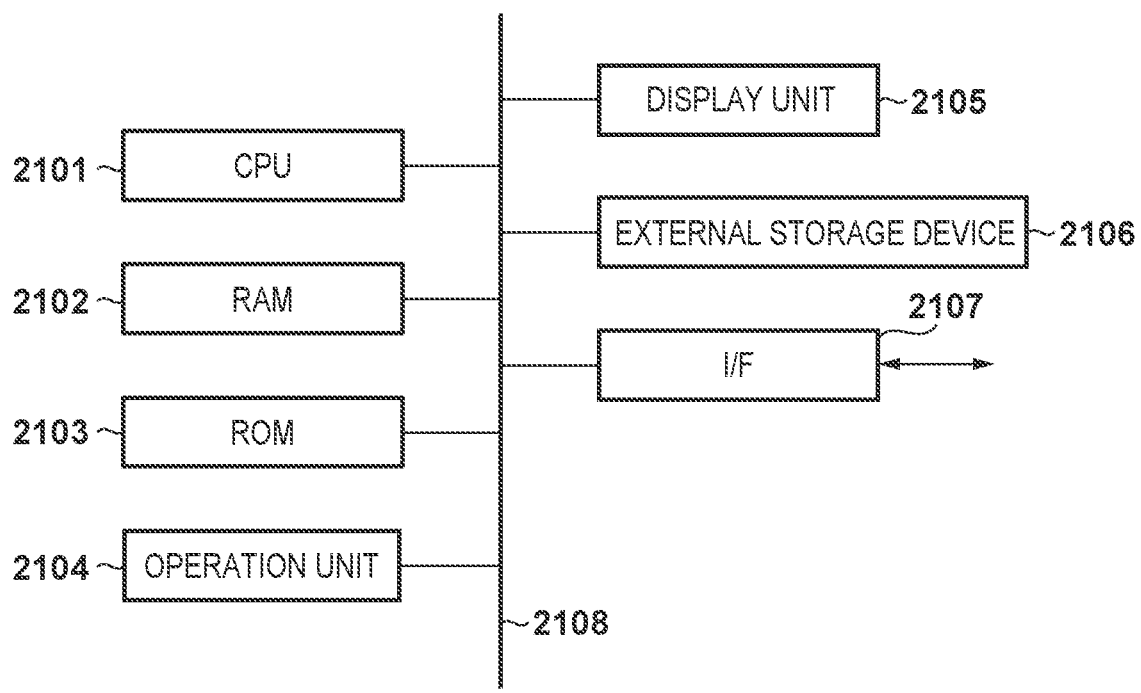
FIG. 21 is a block diagram showing an example of the hardware arrangement of a computer apparatus.

The functional units shown in FIGS. 1, 2, 11, 14, 17, 18, and 20 may be implemented by hardware or by software (computer program). In the latter case, a computer apparatus capable of executing the computer program can be applied to an image processing apparatus explained in each of the above embodiments and modifications. An example of the hardware arrangement of the computer apparatus applicable to the image processing apparatus explained in each of the above embodiments and modifications will be described with reference to the block diagram of FIG. 21.

A CPU 2101 executes various kinds of processing using computer programs and data stored in a RAM 2102 and a ROM 2103. The CPU 2101 thus controls the operation of the entire computer apparatus, and also executes or controls each of the processes explained above as processes to be executed by the image processing apparatus.

The RAM 2102 has an area to store a computer program or data loaded from the ROM 2103 or an external storage device 2106 or data received from the outside via an I/F 2107. In addition, the RAM 2102 has a work area to be used by the CPU 2101 to execute various kinds of processes. The RAM 2102 can thus provide various kinds of areas as needed. The ROM 2103 stores computer programs and data which do not need rewrite.

An operation unit 2104 is formed by user interfaces such as a keyboard and a mouse. A user can input various kinds of instructions to the CPU 2101 by operating the operation unit 2104.

A display unit 2105 is formed by a CRT or a liquid crystal screen and can display the processing result of the CPU 2101 as an image or characters. Note that the display unit 2105 may be a projection device that projects an image or characters on a projection surface, such as a projector device.

The external storage device 2106 is a mass information storage device represented by a hard disk drive. The external storage device 2106 stores an OS (Operating System) or computer programs and data configured to cause the CPU 2101 to execute or control each of the processes explained above as processes to be executed by the image processing apparatus. The computer programs stored in the external storage device 2106 include a computer program configured to cause the CPU 2101 to implement the functions of the functional units shown FIGS. 1, 2, 11, 14, 17, 18, and 20. In addition, the data stored in the external storage device 2106 includes data explained as known information in the above description. The computer program or data stored in the external storage device 2106 is loaded to the RAM 2102 as needed under the control of the CPU 2101 and processed by the CPU 2101.

The I/F 2107 is used to perform data communication with an external device. For example, an image capturing device may be connected to the I/F 2107, and a captured image as a recognition target may be input from the image capturing device.

All of the CPU 2101, the RAM 2102, the ROM 2103, the operation unit 2104, the display unit 2105, the external storage device 2106, and the I/F 2107 are connected to a bus 2108.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-154728, filed Aug. 9, 2017 which is hereby incorporated by reference herein in its entirety.

What is claimed is:

1. An image processing apparatus comprising:
one or more processors which execute instructions stored in one or more memories,
wherein by execution of the instructions the one or more processors function as:
a feature generation unit configured to generate a connected layer feature by connecting outputs of a plurality of layers of a hierarchical neural network obtained by processing an input image using the hierarchical neural network;
a map generation unit configured to generate, based on inputting of the connected layer feature to discriminators corresponding to attributes, for each of the attributes, an attribute score map representing a likelihood of an attribute of a region represented by a coordinate in the input image; and
an output unit configured to generate and output a recognition result for a recognition target in the input image, based on integration information obtained by integrating the attribute score maps for respective attributes generated by the map generation unit,
wherein each of the discriminators has been learned so as to output likelihood of a corresponding attribute, and
wherein at least one of the attribute score maps of the attributes indicates likelihood that a reference position of an object exists at a coordinate in the input image.

2. The apparatus according to claim 1, wherein the output unit generates and outputs a result concerning presence/absence of the object in the input image, based on the integration information.

3. The apparatus according to claim 2, wherein the output unit further generates and outputs a result concerning a label of a category of each region in the input image.

4. The apparatus according to claim 1, further comprising an estimation unit configured to estimate a size of the object by regress an integration result of the attribute score maps for respective attributes generated by the map generation unit.

5. The apparatus according to claim 1, wherein the discriminator outputs a likelihood indicating whether a reference position of the object exists at a coordinate in the region.

6. The apparatus according to claim 1, wherein the map generation unit calculates a score map of likelihoods for each subcategory.

7. The apparatus according to claim 6, wherein each subcategory is a subcategory classified by at least one of a depth rotation of the object, an in-plane rotation of the object, an orientation of the object, a shape of the object, a material of the object, a shape of a region of interest of the object, a size of the region of interest of the object, and an aspect ratio of the region of interest of the object.

8. The apparatus according to claim 1, wherein the output unit outputs information relating to at least one of a depth rotation of the object, an in-plane rotation of the object, an orientation of the object, a shape of the object, a material of the object, a shape of a region of interest of the object, a size of the region of interest of the object, and an aspect ratio of the region of interest of the object.

9. The apparatus according to claim 1, wherein the output unit generates the recognition result of a resolution higher than a resolution of the attribute score map.

10. The apparatus according to claim 1, wherein the output unit estimates a size of the object.

11. The apparatus according to claim 1, wherein the output unit generates a result of classification of the input image.

12. The apparatus according to claim 11, wherein the output unit calculates a score based on the result of the classification and a prior distribution of a subject for each classification.

13. The apparatus according to claim 11, wherein the map generation unit selects, based on the result of the classification, a category to be determined.

14. The apparatus according to claim 1, further comprising a unit configured to input camera information,
wherein the map generation unit uses the camera information in addition to the connected layer feature.

15. The apparatus according to claim 1, further comprising a unit configured to select, as a final output, one of a plurality of results included in the recognition result.

16. The apparatus according to claim 1, further comprising a unit configured to integrally learn parameters of processing with respect to at least two of the hierarchical neural network, the feature generation unit, the map generation unit, and the output unit.

17. The apparatus according to claim 1, wherein the feature generation unit performs up-sampling processing when connecting the outputs of the plurality of layers of the hierarchical neural network.

18. The apparatus according to claim 1, wherein the feature generation unit performs deconvolution processing when connecting the outputs of the plurality of layers of the hierarchical neural network.

19. An image processing method comprising:
generating a connected layer feature by connecting outputs of a plurality of layers of a hierarchical neural network obtained by processing an input image using the hierarchical neural network;
generating, based on inputting of the connected layer feature to discriminators corresponding to attributes, for each of the attributes, an attribute score map representing a likelihood of an attribute of a region represented by a coordinate in the input image; and
generating and outputting a recognition result for a recognition target in the input image, based on integration information obtained by integrating the generated attribute score maps for respective attributes,
wherein each of the discriminators has been learned so as to output likelihood of a corresponding attribute, and
wherein at least one of the attribute score maps of the attributes indicates likelihood that a reference position of an object exists at a coordinate in the input image.

20. A non-transitory computer-readable storage medium storing a computer program for causing a computer to function as:
a feature generation unit configured to generate a connected layer feature by connecting outputs of a plurality of layers of a hierarchical neural network obtained by processing an input image using the hierarchical neural network;
a map generation unit configured to generate, based on inputting of the connected layer feature to discriminators corresponding to attributes, for each of the attributes, an attribute score map representing a likelihood of an attribute of a region represented by a coordinate in the input image; and
an output unit configured to generate and output a recognition result for a recognition target in the input image, based on integration information obtained by integrating the attribute score maps for respective attributes generated by the map generation unit,
wherein each of the discriminators has been learned so as to output likelihood of a corresponding attribute, and
wherein at least one of the attribute score maps of the attributes indicates likelihood that a reference position of an object exists at a coordinate in the input image.

* * * * *